(12) United States Patent
Ramalingam et al.

(10) Patent No.: US 10,798,024 B2
(45) Date of Patent: Oct. 6, 2020

(54) COMMUNICATING CONTROL PLANE DATA AND CONFIGURATION DATA FOR NETWORK DEVICES WITH MULTIPLE SWITCH CARDS

(71) Applicant: Arista Networks, Inc., Santa Clara, CA (US)

(72) Inventors: Arul Ramalingam, Fremont, CA (US); James A. Weaver, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 105 days.

(21) Appl. No.: 16/224,705

(22) Filed: Dec. 18, 2018

(65) Prior Publication Data

US 2020/0195583 A1 Jun. 18, 2020

(51) Int. Cl.
*H04L 12/937* (2013.01)
*H04L 12/933* (2013.01)

(52) U.S. Cl.
CPC .......... *H04L 49/254* (2013.01); *H04L 49/101* (2013.01); *H04L 49/108* (2013.01); *H04L 49/109* (2013.01)

(58) Field of Classification Search
CPC ... H04L 49/254; H04L 49/109; H04L 49/101; H04L 49/108
See application file for complete search history.

(56) References Cited

U.S. PATENT DOCUMENTS

| | | | |
|---|---|---|---|
| 7,756,027 B1* | 7/2010 | Reddy ................. | H04L 41/0806 370/230 |
| 2003/0091059 A1* | 5/2003 | Pike ...................... | H04L 49/351 370/462 |
| 2012/0063299 A1* | 3/2012 | Narasimhan ........ | G06F 11/2007 370/218 |
| 2013/0028091 A1* | 1/2013 | Sun ..................... | H04L 41/0896 370/236 |

* cited by examiner

*Primary Examiner* — Joshua Kading
(74) *Attorney, Agent, or Firm* — Fountainhead Law Group PC

(57) ABSTRACT

In some implementations, a switch card is provided. The switch card includes a set of switch chips configured to communicate data with a plurality of line cards. The plurality of line cards is coupled to a second switch card. The second switch card comprises a second set of switch chips. The switch card also includes a communication component coupled to the set of switch chips. The communication component is configured to determine whether the switch card should operate in a master mode or a slave mode. In response to determining that the switch card should operate in the master mode, the switch card is also configured to receive control plane data from a supervisor card. The switch card is further configured to communicate the control plane data to one or more switch chips of the set of switch chips and the second set of switch chips.

20 Claims, 15 Drawing Sheets

COMMUNICATING CONTROL PLANE DATA AND CONFIGURATION DATA FOR NETWORK DEVICES WITH MULTIPLE SWITCH CARDS

BACKGROUND

A network device, such as a network switch device, typically has multiple line cards, and each line card can have multiple lines. Multiple switch cards each containing multiple switch circuits for connecting the line cards are common in such devices. Connector pin density and area on the cards (e.g., printed circuit boards) for connectors are limiting factors in packaging density for network devices. In addition, signal loss in the connections between different components of the switch cards and/or line cards may also be a limiting factor in the design of network devices. Obstructions for cooling airflow are also factors for design consideration.

SUMMARY

In some implementations, a switch card is provided. The switch card includes a printed circuit board. The switch card also includes a switch chip coupled to the printed circuit board, the switch chip configured to communicate data with a plurality of line cards. The switch card further includes a plurality of connectors coupled to the switch chip. Each connector of the plurality of connectors is configured to couple with multiple line cards. Each connector comprises a multiple sets of connector pins. Each set of connector pins of each connector is coupled to a different line card.

In some implementations, a network device is provided. The network device includes a plurality of line cards. The network device also includes a first switch card comprising a first plurality of connectors configured to couple to the plurality of line cards. Each connector of the first plurality of connectors is configured to couple with multiple line cards. The network device further includes a second switch card comprising a second plurality of connectors configured to couple to the plurality of line cards. Each connector of the second plurality of connectors is configured to couple with multiple line cards.

In some implementations, a method is provided. The method includes obtaining a switch card, wherein the switch card comprises a switch chip and a plurality of connectors coupled to the switch chip. The method also includes obtaining a plurality of line cards. The method further includes obtaining a connection cartridge. The method further includes coupling the switch card to the plurality of line cards via the connection cartridge. The connection cartridge is configured to couple each connector of the plurality of connectors to with multiple line cards.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various embodiments of a network switch device described herein have multiple line cards mounted orthogonal to and electrically coupled to multiple switch cards. Each connector of the switch card may be coupled to multiple line cards. The connectors of the switch cards and the connectors of the line cards may be interconnected via a connection cartridge. The connection cartridge may include multiple sets of cables, wires, pins, traces, etc. A larger switch card may be divided into multiple smaller switch cards and which may be coupled to the multiple line cards via the connector cartridge. Using multiple smaller fabric cards and/or using the connection cartridge may help address multiple problems in packaging, connectivity, signal loss, servicing and replacement of components, and deployment or configuration in a rackmount environment.

Figure 1:
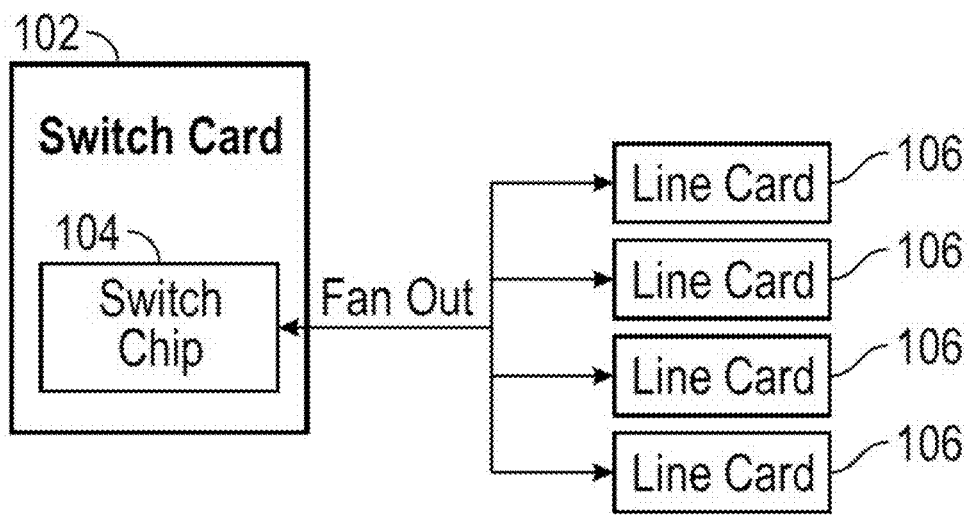
FIG. 1 is a block diagram illustrating an example a switch card, in accordance with some embodiments of the present disclosure.

FIG. 1 is a block diagram illustrating an example a switch card 102, in accordance with some embodiments of the present disclosure. The switch card 102 includes a switch chip 104 that fans out to multiple line cards 106. The switch card and the line cards 106 may be included in a network device, such as a network switch. The switch card 102 may be referred to as a fabric card, a fabric switch card, etc. In one embodiment, rather than having multiple switch cards 102 and/or multiple switch chips 104, the network switch device has a single, non-redundant switch card 102 with a single (or multiple) switch chip 104 that has all of the switches for the network switch. The switches within switch chip 104 may be referred to as switching paths or routing paths. These switching paths or routing paths couple and/or connect ingress and egress ports of switch chip 104 through the switch fabric in some embodiments. One issue to address in the illustrated design is how to couple the switch chip 104 and all of the line cards 106 in a compact manner that does not obstruct airflow inside a housing. For example, if all of the line cards are arranged parallel to the switch card and along one edge of the switch card 102, e.g., with edge connectors, the switch card becomes unduly large as a result of the linear dimensions required for all of the interconnections. Other arrangements have related packaging issues because of the interconnections with the line cards. It should be appreciated that while a single switch chip is illustrated on the switch card, multiple switch chips may be integrated onto the switch card. It should be further appreciated that some of the embodiments provide a single switch card or fabric card as opposed to multiple switch cards or fabric cards of a device.

Figure 2:
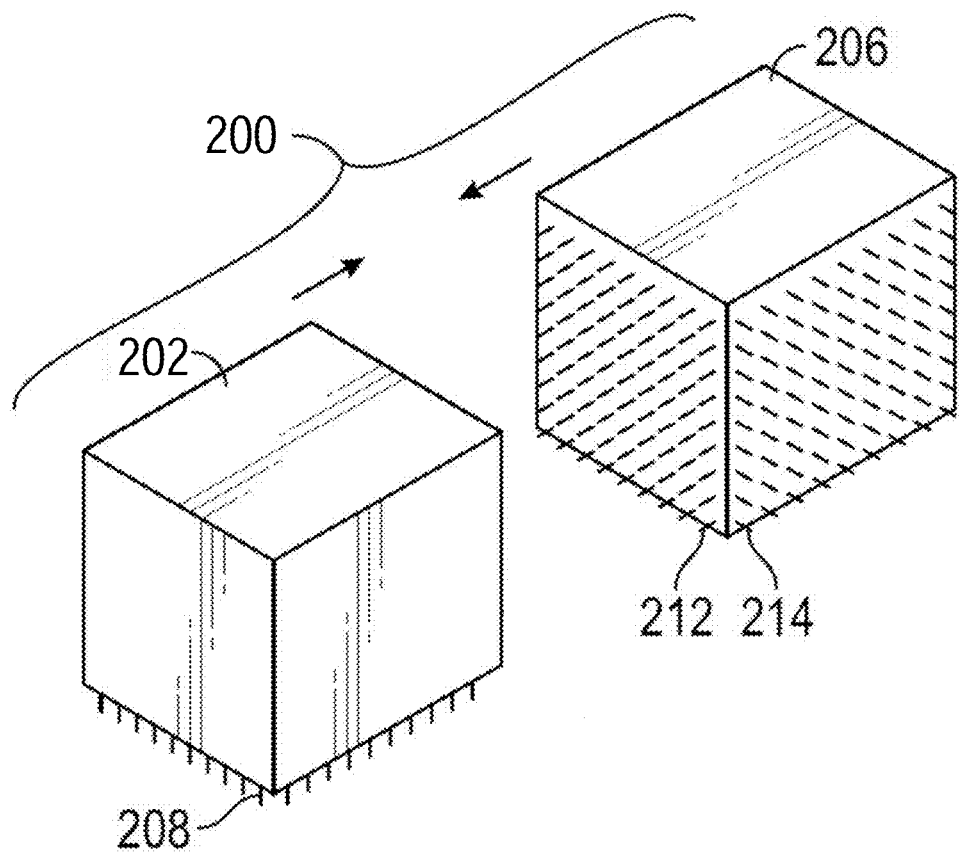
FIG. 2 is a diagram illustrating a perspective view of an example orthogonal connector, in accordance with some embodiments of the present disclosure.

FIG. 2 is a diagram illustrating a perspective view of an example orthogonal connector 200, in accordance with some embodiments of the present disclosure. Various orthogonal connectors are available from vendors, with various numbers of conductors, dimensions and relative orientations, and embodiments are not limited to the specific connectors shown herein. In this version, pins 212 of one connector 206 (e.g., a male connector) are inserted into sockets or pin receptacles of another connector 202 (e.g., a female connector), with solder pins 214 of the one connector 206 perpendicular or orthogonal to the solder pins 208 of the other connector 202. This mates the two connectors 202, 206 of the orthogonal connector 200. Orthogonal connectors may have a specific handedness or orientation of orthogonality (e.g., as keyed), or may have one connector rotatable with respect to the other connector. It should be appreciated that the mating or engagement of connectors 202 and 206 may utilize any suitable orientation that results in the orthogonal orientation discussed herein. When a printed circuit board or card is assembled to one connector 206 and another printed circuit board or card is assembled to the other connector 202, and the connectors 202, 206 are assembled to each other (i.e., mated) as the orthogonal connector 200, the two printed circuit boards or cards are orthogonal to each other as shown in FIG. 2. Note that two such printed circuit boards would meet each other edge to edge, with the edge of one printed circuit board adjacent and perpendicular to the edge of the other printed circuit board, rather than edge to face as is the case with orthogonal board connectors, e.g., that position one printed circuit board perpendicular and coupled to a central region of a face of another printed circuit board. The connector 202 may be part of a switch card and the connector 206 may be part of a line card. The connector 202 may be referred to as a switch card connector and the connector 206 may be referred to a line card connector.

The term "connector" is understood to apply to a large variety of connectors with a large variety of numbers of conductors, and to groups of connectors, individual connectors, and components of a connector. For example, a male plug having one or more pins or prongs is considered a connector, a female socket having one or more pin or prong receptacles or socket contacts is considered a connector, and the combination of a male plug and female socket is a connector, as are hermaphrodite connectors and their components. Groups of multiple male connectors are considered a connector, as are groups of female connectors, and groups of hermaphrodite connectors. Connections to a connector can be made for example by crimping, soldering (pins or surface mount), or fastening, and can be made by wires, printed circuit board pads, plated through holes, edges or traces, or other connectors among various possibilities. Other types of pins, pads, wires, traces, etc., may be used in other embodiments. For example, press fit pins may be used to couple a connector to a printed circuit board.

Figure 3:
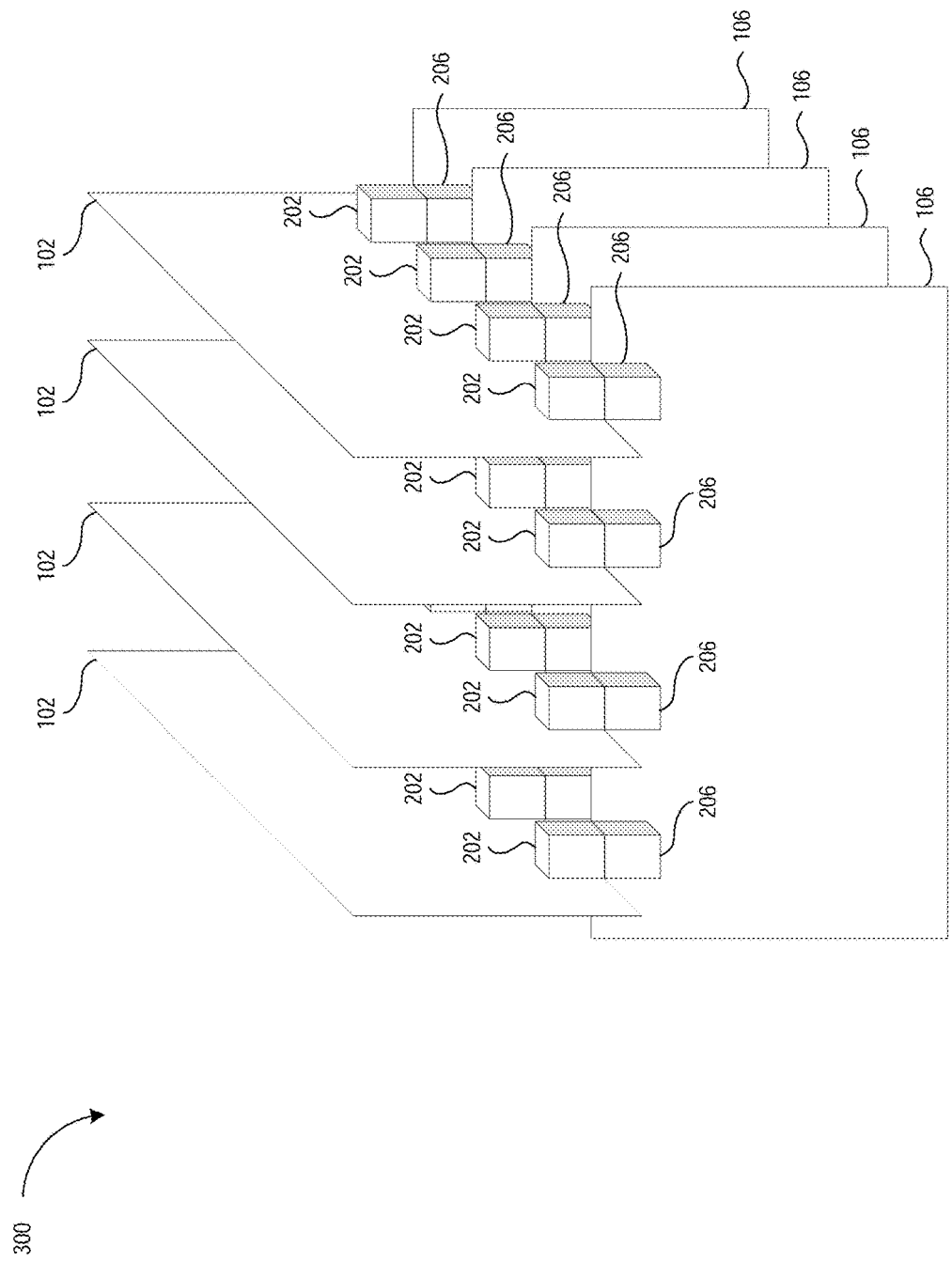
FIG. 3 is a diagram illustrating an example network device, in accordance with some embodiments of the present disclosure.

FIG. 3 is a diagram illustrating an example network device 300, in accordance with some embodiments of the present disclosure. The network device 300 includes multiple line cards 106 coupled through orthogonal connectors 202, 206 (i.e., orthogonal connectors 200) to multiple switch cards 102. Circuits and signals of each line card 106 are coupled to the switch chips of the switch cards 102 through the connectors 202, 206, which orient the line cards 106 parallel to each other and orthogonal to the switch cards 102. One edge of each line card 106 meets with (i.e., is adjacent to), and is perpendicular to, one edge of the switch cards 102. In some embodiments, each connector 202, 206 is a single component, and in other embodiments, connectors 202 are combined into one connector, and/or connectors 206 are combined into one connector. Collectively, the combination of connectors 202, 206 in various embodiments can be viewed as a connector, or multiple connectors. The line cards 106 may include hardware, software, firmware, or a combination thereof to connect to external user equipment. The switch cards 102 may provide connections between the line cards 106 (e.g., may interconnect the line cards 106).

Network devices, such as network device 300 may be implemented more efficiently using the orthogonal arrangement of line cards 106 and switch cards 102, as illustrated in FIG. 3. For example, in the orthogonal arrangement/configuration illustrated in FIG. 3, each switch card 102 is coupled to each line card 106 at the points where the line and fabric cards cross. This may reduce trace routing and/or signal loss that is associated with general/traditional backplane implementation. In addition, the orthogonal arrangement/configuration illustrated in FIG. 3 may allow for more airflow through the network device 300 which may help decrease the temperature within the network device 300 (e.g., may increase the cooling of the network device 300, may decrease the temperature of components of the switch cards 102 and the line cards 106). Although four switch cards 102 and four line cards 106 are illustrated in FIG. 3, any number of line cards and/or switch cards may be used in the network device 300, in other embodiments.

Figure 4:
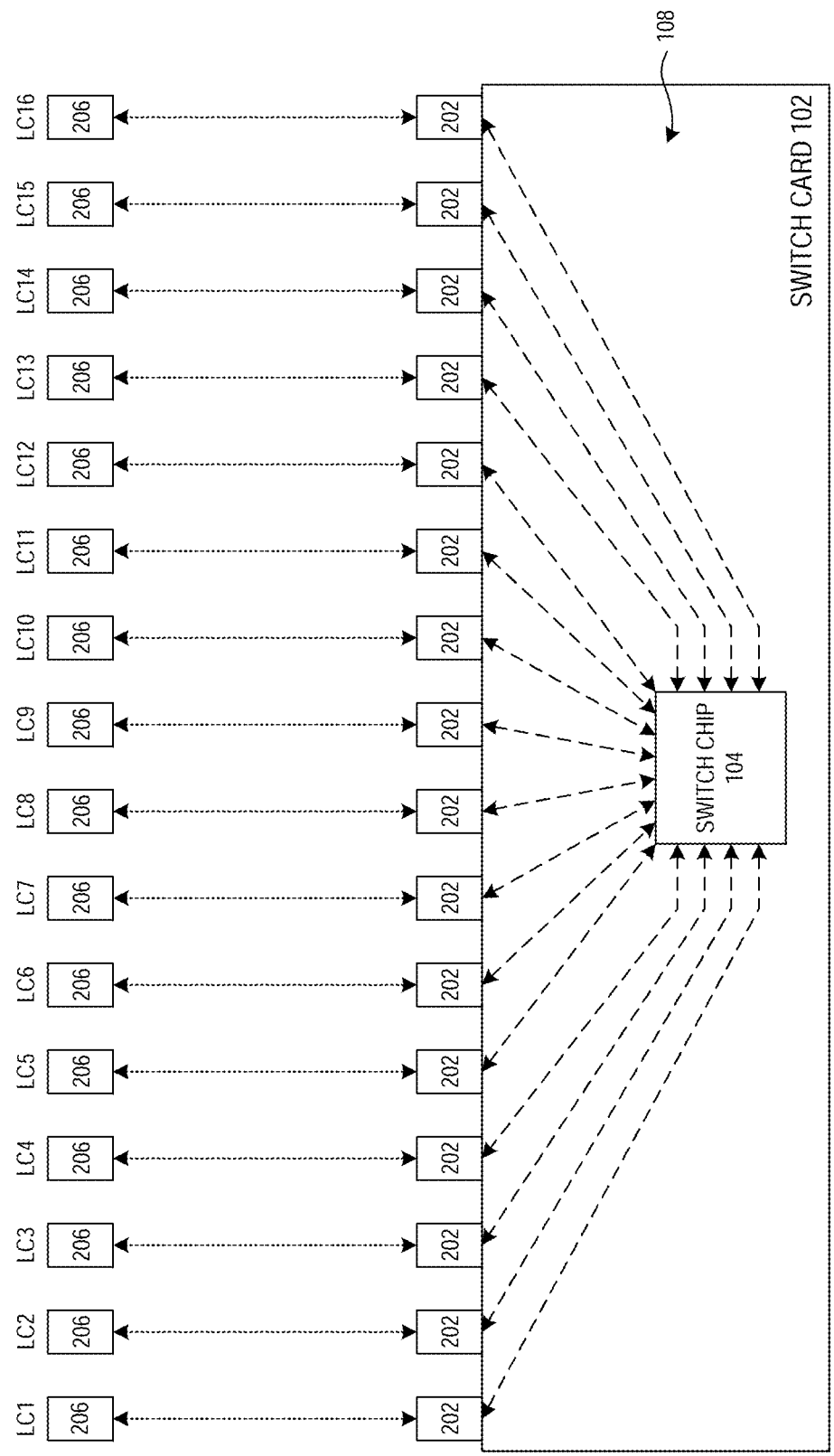
FIG. 4 is a block diagram illustrating an example switch card, in accordance with some embodiments of the present disclosure.

FIG. 4 is a block diagram illustrating an example switch card 102, in accordance with some embodiments of the present disclosure. As discussed above, switch card 102 (e.g., a fabric card, a fabric switch card, etc.) includes a switch chip 104 (e.g., a fabric chip, a fabric switch chip, etc.) that is mounted on, attached to, installed on, located on, etc., a printed circuit board 108. The switch chip 104 is coupled to connectors 202. Each connector 202 (of the switch card 102) may be coupled to the switch chip 104 via a connection, as illustrated by the dashed lines between each connector 202 and the switch chip 104. Each connection (e.g., each dashed line) may include one or more (e.g., a set of) wires, lines, pins traces, etc. Each connection may be located within and/or on top of the printed circuit board 108. For example, each connection may be one or more wires that may run between a connector 202 and the switch card 102 within the printed circuit board 108. Each connector 202 (e.g., a line card connector) may be coupled to connector 206 of a line card (e.g., a line card connector), as illustrated by the dotted lines. Each of the connectors 206 may be coupled to a different line card. For example, there are sixteen connectors 206 illustrated in FIG. 4 and each connector 206 may be coupled to one of sixteen line cards (not illustrated in FIG. 4), which are labelled LC1 through LC16.

As the number of line cards in network devices increases, the number of connectors 202 on the switch card 102 will increase as well, in order for the switch chip 104 to be able to communicate data with all of the line cards in the network devices. Increasing the number of connectors 202 increases the number of connections (e.g., wires, pins, traces, etc.) between the connectors 202 and the switch chip 104. Thus, the size of the switch card 102 will increase as the number of line cards in the network devices increase. For example, the length and width of the switch card 102 may be increased in order to provide connections and/or connectors 202 for the line cards. In another example, the thickness of the printed circuit board 108 of the switch card 102 may also increase in order to accommodate the connections between the switch chip 104 and the connectors 202.

Each connector 202 may have a bandwidth. The bandwidth may be the maximum amount of data that the connector 202 is able to communicate (e.g., the maximum amount of data that a connector 202 is able to transmit and/or receive). In some embodiments, the connectors 206 may have bandwidths that are the same as the connectors 202. In other embodiments, the connectors 206 may have bandwidths that are different from the connectors 202. The bandwidth of a connector may also be referred to as data bandwidth, capacity, throughput, speed, etc.

As illustrated in FIG. 4, the connections between the connectors 202 and the switch chip 104 may be longer connections. For example, the connections between the switch chip 104, and the leftmost connector 202 and the right most connector 202, may be longer connections (e.g., longer wires, longer pins, longer traces, etc.). The connections between the connectors 202 and the switch chip 104 may be constructed/built of higher loss media which may have or experience signal loss at higher bit/data rates. For example, at higher bit/data rates, the connections (e.g., the higher loss media) may communicate (e.g., transmit/receive) data with more errors, which may result in higher bit error rates. The longer the connection between the connectors 202 and the switch chip 103, the larger the signal loss at the higher bit/data rates. In addition, increasing the number of line cards (which increase the number of connectors 202), will also increase the length of the connections. For example, if additional connectors 202 are added to the switch card 102, the connections for the additional connectors 202 will be longer than the connections illustrated in FIG. 4.

Signal regeneration hardware (e.g., circuits, modules, components, etc.) may be used to boost the signal that is transmitted between the connectors 202 and the switch chip 104 via the connections. For example, signal regeneration hardware may be coupled to the connections between the connectors 202 and the switch chip 104 to boost or repeat signals to reduce the amount of signal loss on the connections. However, signal regeneration hardware increases the cost, complexity, and/or power usage of the switch card 102.

Cables may also be used to reduce the amount of signal loss between two endpoints (e.g., between the switch chip 104 and the connectors 202). Cables may use medium/media (e.g., materials) that have less signal loss than printed circuit boards. For example, the cables may be twinaxial (twinax) cables, coaxial (coax) cables, fiber optic cables, etc., which may have less signal loss than the connections between the connectors 202 and the switch chip 104 than printed circuit boards. Although the present disclosure may refer to twinax cables, any appropriate type of cable or connection may be used to couple the connectors 202 and the connectors 206. The cables may be placed in a cable mid-plane that is disposed or located between the switch card 102 and the line cards. However, using a cable mid-plane may decrease the amount of airflow through the network device as the cables may block the airflow. In addition, the cable mid-plane may increase the complexity/difficulty when coupling the line cards to the switch card 102. For example, each connector 202 may use a cable to couple the connectors 206 of the line cards (e.g., line card connectors) to the connectors 202 of the switch card 102 (e.g., switch card connectors). This may increase the complexity and/or difficulty when connecting/coupled the line cards to the switch cards in a network device.

Thus, it may be useful to increase the number of line cards that may be supported and/or used by a network device, without increasing the signal loss of the connections between the switch chips 104 and the connectors 202 of the switch cards. It may also be useful to increase the number of line cards that may be supported and/or used by a network device, without reducing the airflow through the network device and without increasing the difficulty/complexity in coupling the line cards with the switch cards.

Figure 5A:
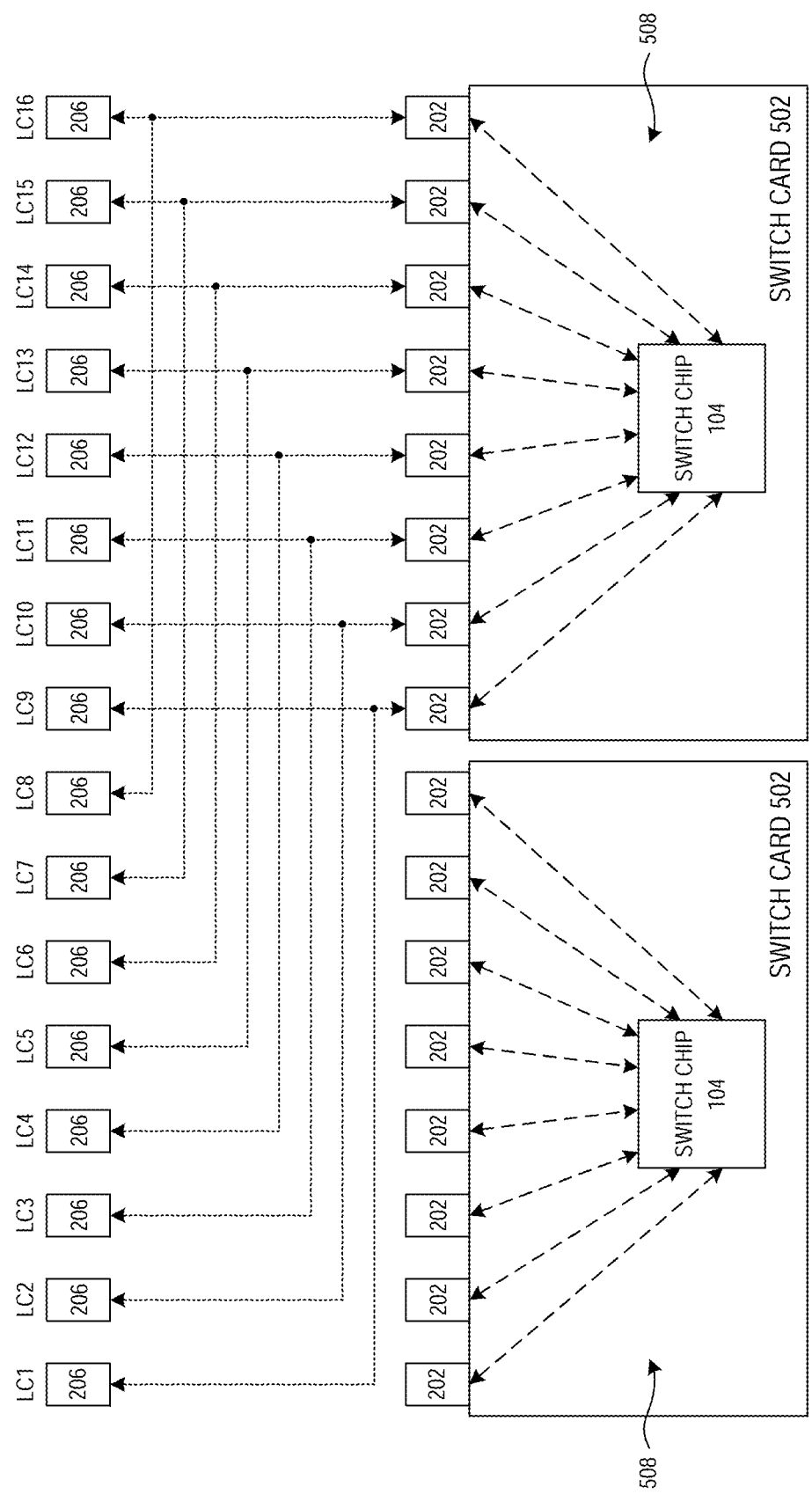
FIG. 5A is a block diagram illustrating example switch cards, in accordance with some embodiments of the present disclosure.

FIG. 5A is a block diagram illustrating example switch cards 502, in accordance with some embodiments of the present disclosure. As discussed above, each switch card 502 includes a switch chip 104 (e.g., a fabric chip, a fabric switch chip, etc.) that is mounted on, attached to, installed on, located on, etc., a printed circuit board 508. Each switch chip 104 is coupled to connectors 202 of the respective switch card 502. For example, the right switch chip 104 is coupled to the eight connectors 202 of the right switch card 502. In another example, the right switch chip 104 is coupled to the eight connectors 202 of the right switch card 502. Each connector 202 (of the switch card 102) may be coupled to a respective switch chip 104 via a connection, as illustrated by the dashed lines between each connector 202 and the switch chip 104. Each connection (e.g., each dashed line) may include one or more (e.g., a set of) wires, lines, pins traces, etc. Each connection may be located within and/or on top of the printed circuit board 108, as discussed above. Each connector 202 (e.g., a line card connector) may be coupled to connector 206 of a line card (e.g., a line card connector), as illustrated by the dotted lines. Each of the connectors 206 may be coupled to a different line card. For example, there are sixteen connectors 206 illustrated in FIG. 5A and each connector 206 may be coupled to one of sixteen line cards (not illustrated in FIG. 5A), which are labelled LC1 through LC16. As discussed above, each connector 202 may have a bandwidth. In some embodiments, the connectors 206 may have bandwidths that are the same as the connectors 202. In other embodiments, the connectors 206 may have bandwidths that are different from the connectors 202.

As illustrated in FIG. 5A, a larger switch card (e.g., switch card 102 illustrated in FIG. 4) may be divided into multiple, smaller switch cards, such as such switch cards 502. Thus, instead of a single switch card with sixteen connectors 202, two switch cards 502 with eight connectors 202 each are used. In FIG. 5A, the eight connectors 202 of the right switch card 502 are coupled to the connectors 206 of a set (e.g., one or more) of line cards. Each connector 202 is coupled to two connectors 206 of two different line cards. For example, the first connector 202 (from the left) of the right switch card 502 is coupled to the connectors 206 of line cards LC1 and LC9. In another example, the fifth connector 202 (from the left) of the right switch card 502 is coupled to the connectors 206 of line cards LC13 and LC5.

Also as illustrated in FIG. 5A, each connector 202 (e.g., a switch or fabric card connector) of the right switch card 502 may be coupled to a connector 206 of a line card (e.g., a line card connector), as illustrated by the dotted lines. Each of the connectors 206 may be coupled to a different line card. For example, there are sixteen connectors 206 illustrated in FIG. 4 and each connector 206 may be coupled to one of sixteen line cards LC1 through LC16.

The connections between the connectors 206 and the connectors 202 may be cables, such as twinax cables. In one embodiment, the bandwidth of the connections to the connectors 206 of the line cards LC1 through LC 16 may use a portion of the bandwidth of the connectors 206. For example, if a connector 206 has a bandwidth of BW, each connection to the connectors 206 may have a bandwidth of BW/2 (e.g., half of the bandwidth BW). Using a portion of the bandwidth of the connectors 206 or dividing the bandwidth of the connectors 206 may be referred to as bit-slicing a connection or bit-slicing the bandwidth. The portion of the bandwidth BW that is used may be less than the bandwidth BW (e.g., half the bandwidth, a third of the bandwidth, a fourth of the bandwidth, an eight of the bandwidth, or any appropriate portion of the bandwidth).

Figure 5B:
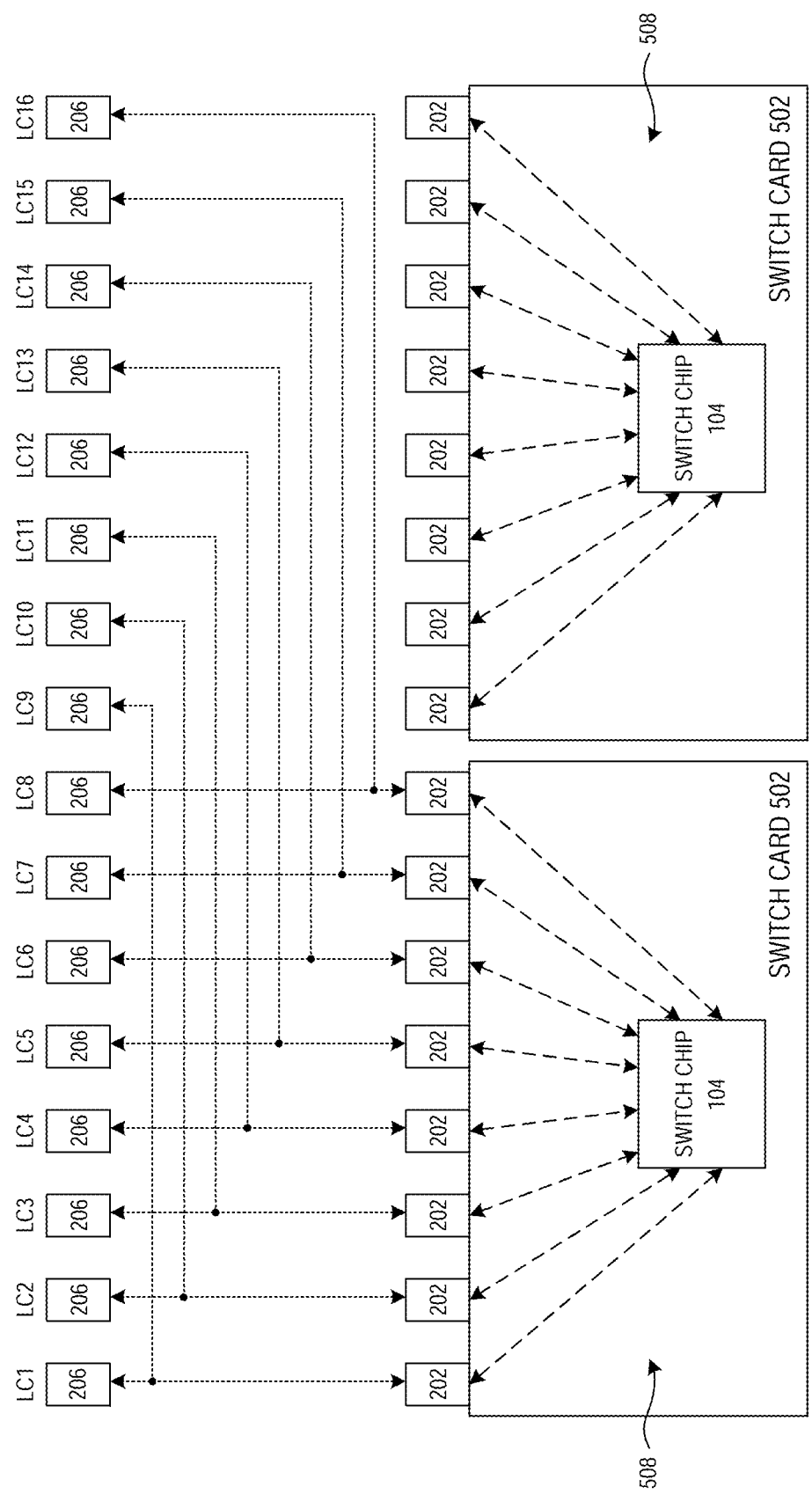
FIG. 5B is a block diagram illustrating example switch cards, in accordance with some embodiments of the present disclosure.

As illustrated in FIG. 5A, the length of the connections between the connectors 202 and the switch chip 104 are reduced when compared to the length of the connections illustrated in FIG. 4 because the switch cards 502 are smaller and/or have few connectors 202. Reducing the length of the connections in the printed circuit board between the connectors 202 and the switch chip 104 may reduce the amount of signal loss in the connections between the connectors 202 and the switch chip 104. A lower loss medium, such as twinax cables is used to form the connections between the connectors 202 of the right switch card 502 and the connectors 206 of the line cards LC1 through LC16. Although the connections to the connectors 206 use a portion (e.g., half) of the bandwidth of the connectors 206, the remaining portion of the bandwidth of the connectors 206 (e.g., the remaining half) may be used by connections (e.g., twinax cables) from the left switch card 502, as illustrated in FIG. 5B and discussed further below. This allows the full bandwidth of the connectors 206 and/or the connectors 202 to be utilized by the line cards LC1 through LC16 and the switch cards 502.

In one embodiment, connectors 202 may each include multiple sets of connector pins (e.g., multiple sets of one or more wires, traces, etc.). Each set of connector pins may be coupled to a different line card via a connector 206 of the respective line card. For example, the first connector 202 (from the left) of the right switch card 502 may include a set of connectors pins coupled to the connector 206 of line card LC1 and a second set of connectors pins coupled to line card LC9. In another example, the fifth connector 202 (from the left) of the right switch card 502 may include a set of connectors pins coupled to the connector 206 of line card LC13 and a second set of connectors pins coupled to line card LC5.

In one embodiment, each of the sets of connector pins may use a portion of the bandwidth of a connector 206 (e.g., of a line card connector). For example, the first connector 202 (from the left) of the right switch card 502 may include two sets of connector pins. Each set of connector pins may use half (e.g., a portion) of the bandwidth of the first connector 202. Although the present disclosure may refer to example portions of the bandwidth of a connector (e.g., half, a third, a fourth, a fifth, an eighth, etc.), any appropriate portion of the bandwidth of a connector may be used in other embodiments.

In some embodiments, the portion of the bandwidth of a connector used by a set of connector pins and/or by a connection (e.g., a twinax cable) may be based on the number of switch cards in a network device and/or the number of line cards in the network device. For example, if four smaller switch cards are used rather than one larger switch card, each set of connector pins and/or each connection (e.g., each twinax cable that is coupled to a connector 206) may use a fourth of the bandwidth of the connectors 202 and/or connectors 206.

In one embodiment, the switch card 502 may be coupled to the connectors 206 of the line cards LC1 through LC16 via a connection cartridge. The connection cartridge may include a plurality of connections or cables, such as twinax cables. The connection cartridge may interconnect the connectors 202 of the switch cards 502 and the connectors 206 of the line cards LC1 through LC16 according in the configurations illustrated in FIGS. 5A through 8. The cables and/or connections of the connection cartridge may have less signal loss than the connections between the switch chips 104 and the connectors 202 because the cables and/or connections may be constructed of, built with, and/or use a lower loss media/medium.

FIG. 5B is a block diagram illustrating example switch cards 502, in accordance with some embodiments of the present disclosure. As discussed above, each switch card 502 includes a switch chip 104 (e.g., a fabric chip, a fabric switch chip, etc.) that is mounted on, attached to, installed on, located on, etc., a printed circuit board 508. Each switch chip 104 is coupled to connectors 202 of the respective switch card 502. Each connector 202 (of the switch card 102) may be coupled to a respective switch chip 104 via a connection, as illustrated by the dashed lines between each connector 202 and the switch chip 104. Each connection (e.g., each dashed line) may include one or more (e.g., a set of) wires, lines, pins traces, etc. Each connection may be located within and/or on top of the printed circuit board 108, as discussed above. Each connector 202 (e.g., a line card connector) may be coupled to connector 206 of a line card (e.g., a line card connector), as illustrated by the dotted lines. Each of the connectors 206 may be coupled to a different line card (e.g., line cards LC1 through LC16). As discussed above, each connector 202 may have a bandwidth. In some embodiments, the connectors 206 may have bandwidths that are the same as the connectors 202. In other embodiments, the connectors 206 may have bandwidths that are different from the connectors 202.

As illustrated in FIG. 5B, a larger switch card (e.g., switch card 102 illustrated in FIG. 4) may be divided into multiple, smaller switch cards, such as such switch cards 502. Thus, instead of a switch card with sixteen connectors 202, two switch cards 502 with eight connectors 202 each are used. In FIG. 5B, the eight connectors 202 of the left switch card 502 are coupled to the connectors 206 of a set (e.g., one or more) of line cards. Each connector 202 is coupled to two connectors 206 of two different line cards. Also as illustrated in FIG. 5A, each connector 202 (e.g., a line card connector) of the left switch card 502 may be coupled multiple connectors 206 of multiple line cards, as illustrated by the dotted lines. The connections between the connectors 206 and the connectors 202 may be cables, such as twinax cables. In one embodiment, the bandwidth of the connections to the connectors 206 of the line cards LC1 through LC 16 may use a portion of the bandwidth of the connectors 206. Using a portion of the bandwidth of the connectors 206 or dividing the bandwidth of the connectors 206 may be referred to as bit-slicing a connection or bit-slicing the bandwidth.

As illustrated in FIG. 5B, the length of the connections between the connectors 202 and the switch chip 104 are reduced when compared to the length of the connections illustrated in FIG. 4 because the switch cards 502 are smaller and/or have few connectors 202. Reducing the length of the connections between the connectors 202 and the switch chip 104 may reduce the amount of signal loss in the connections between the connectors 202 and the switch chip 104. A lower loss medium, such as twinax cables is used to form the connections between the connectors 202 of the right switch card 502 and the connectors 206 of the line cards LC1 through LC16. Although the connections to the connectors 206 use a portion (e.g., half) of the bandwidth of the connectors 206, the remaining portion of the bandwidth of the connectors 206 (e.g., the remaining half) may be used by connections (e.g., twinax cables) from the right switch card 502, as illustrated in FIG. 5B. This allows the full bandwidth of the connectors 206 and/or the connectors 202 to be utilized by the line cards LC1 through LC16 and the switch cards 502.

In one embodiment, connectors 202 may each include multiple sets of connector pins (e.g., multiple sets of one or more wires, traces, etc.). Each set of connector pins may be coupled to a different line card via a connector 206 of the respective line card. In another embodiment, each of the set of connector pins may use a portion of the bandwidth of a connector 206 (e.g., of a line card connector). In some embodiments, the portion of the bandwidth of a connector used by a set of connector pins and/or by a connection (e.g., a twinax cable) may be based on the number of switch cards in a network device and/or the number of line cards in the network device.

In one embodiment, the switch card 502 may be coupled to the connectors 206 of the line cards LC1 through LC16 via a connection cartridge. The connection cartridge may include a plurality of connections or cables, such as twinax cables. The connection cartridge may interconnect the connectors 202 of the switch cards 502 and the connectors 206 of the line cards LC1 through LC16 according in the configuration illustrated in FIGS. 5A through 8. The cables and/or connections of the connection cartridge may have less signal loss than the connections between the switch chips 104 and the connectors 202 because the cables and/or connections may be constructed of, built with, and/or use a lower loss media/medium.

In some embodiments, the switch cards 502 may be identical. For example, the switch cards 502 may have the same number of connectors 202. In other embodiments, the switch cards 502 may not be identical. For example, if there are twelve line cards, a first switch card may have eight connectors 202 and a second switch card may have four connectors 202. Although the present disclosure may illustrate dividing a larger switch card into two smaller switch cards or four smaller switch cards, other embodiments may divide a larger switch card into any appropriate number of smaller switch cards (e.g., into three smaller switch cards, into ten smaller switch cards, etc.).

Figure 6:
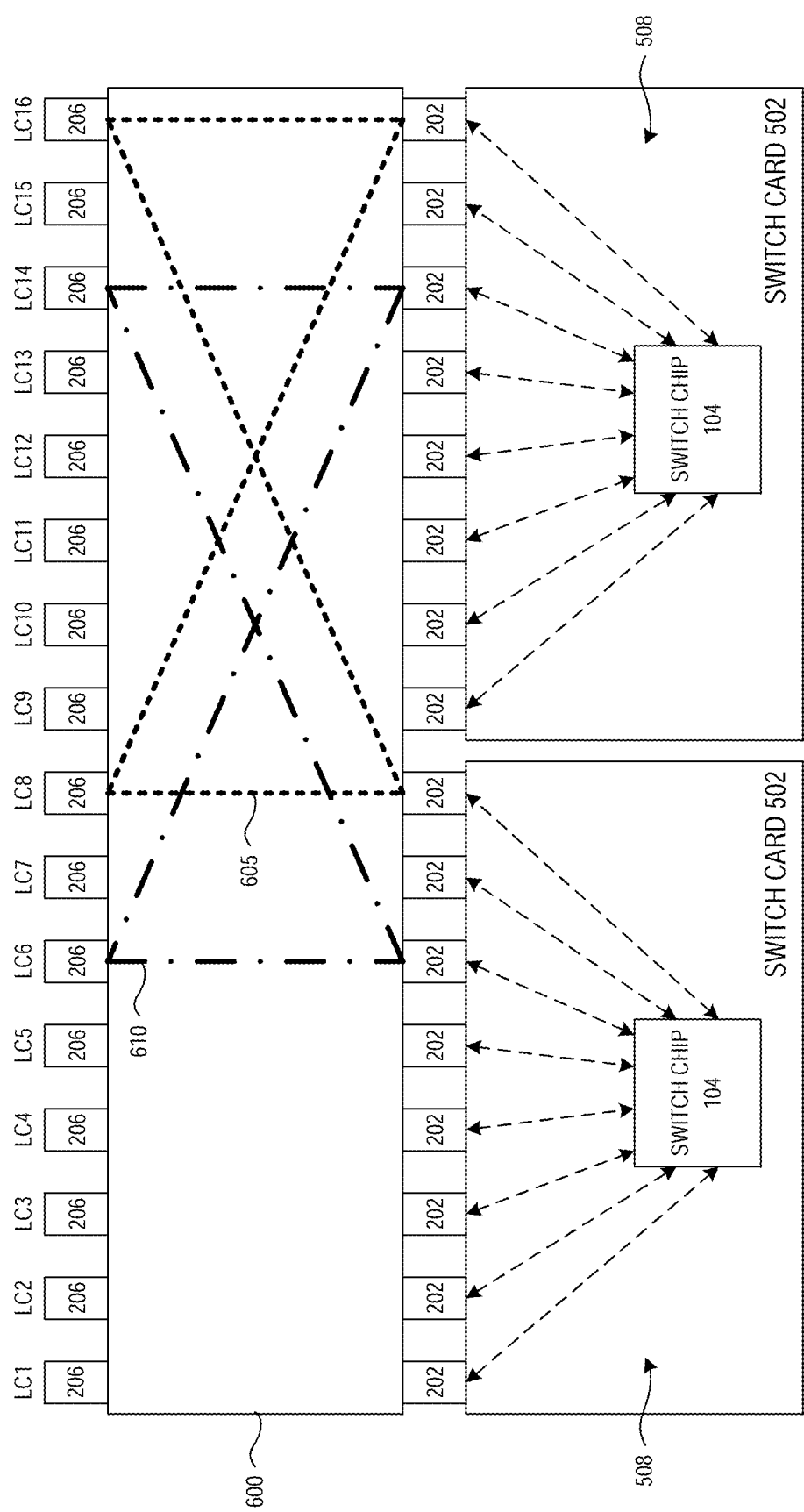
FIG. 6 is a block diagram illustrating an example connection cartridge, in accordance with some embodiments of the present disclosure.

FIG. 6 is a block diagram illustrating an example connection cartridge 600, in accordance with some embodiments of the present disclosure. As discussed above, each switch card 502 includes a switch chip 104 that is mounted on, attached to, installed on, located on, etc., a printed circuit board 508. Each switch chip 104 is coupled to connectors 202 of the respective switch card 502. Each connector 202 (of the switch card 102) may be coupled to a respective switch chip 104 via a connection (e.g., one or more wires, pins, traces, etc.). Each connector 202 may be coupled to one or more connectors 206 of the line cards LC1 through LC16. Each of the connectors 202 may be coupled to multiple line cards. Each connector 202 and each connector 206 may have a bandwidth. Each connector 202 may be coupled to two connectors 206 of two different line cards. Connectors 202 may each include multiple sets of connector pins (e.g., multiple sets of one or more wires, traces, etc.). Each set of connector pins may be coupled to a different line card via a connector 206 of the respective line card. In another embodiment, each of the set of connector pins may use a portion of the bandwidth of a connector 206 (e.g., of a line card connector).

The switch cards 502 may be coupled to the connectors 206 of the line cards LC1 through LC16 via a connection cartridge 600. The connection cartridge 600 includes a plurality of connections or cables, such as twinax cables. The connection cartridge 600 may interconnect the connectors 202 of the switch cards 502 and the connectors 206 of the line cards LC1 through LC16 according in the configuration illustrated in FIGS. 5A and 5B. The cables and/or connections of the connection cartridge 600 may have less signal loss than the connections between the switch chips 104 and the connectors 202 because the cables and/or connections may be constructed of, built with, and/or use a lower loss media/medium.

In some embodiments, connection cartridge 600 may include multiple sets of cables (e.g., twinax cables). FIG. 6 illustrates an example set of cables 605 that may be part of the connection cartridge 600. The set of cables 605 includes four cables. The set of cables 605 couples the last connector 202 (starting from the left) of the left switch card 502 to line cards LC8 and LC 16. The set of cables 605 also couples the eighth connector 202 (starting from the left) of the right switch card 502 to the line cards LC8 and LC16. The layout or configuration of the set of cables 605 may be duplicated within the connection cartridge 600 and may be used to couple the connectors 202 of the switch cards 502 with the connectors 206 of the line cards LC1 through LC16. For example, the set of cables 610 may be a duplicate of the set of cables 605. The set of cables 610 includes four cables. The set of cables 610 couples the sixth connector 202 (starting from the left) of the left switch card 502 to line cards LC6 and LC14. The set of cables 610 also couples the sixth connector 202 (starting from the left) of the right switch card 502 to the line cards LC6 and LC14. Thus, there may be a total of eight sets of cables that are used to interconnect the connectors 202 and the connectors 206.

In one embodiment, the bandwidth of the cables (e.g., twinax cables) that form the sets of cables may use a portion of the bandwidth of the connectors 202 and/or 206. For example, each cable may use half, a third, a fourth, and eighth, etc., of the bandwidth of the connectors 202 and/or 206. As discussed above, this may be referred to as bit-slicing a connection or bit-slicing the bandwidth.

In one embodiment, each connector 202 may include 128 pairs of connections (e.g., 128 pairs of signal wires, 128 differential signal pairs, 128 pairs of pins, traces, etc.). Each connector 206 may also include 128 pairs of connections. Each of the cables in the connection cartridge 600 may include 64 pairs of wires, pins, traces, etc. Thus, each cable in the connection cartridge 600 may use half of the bandwidth, capacity, throughput, etc., of the connectors 202 and/or 206. In other embodiments, each connector and/or cable may use different numbers of pairs of connections (e.g., a different number of differential signal pairs).

In some embodiments, the connection cartridge 600 allows for the easier installation and removal of cables (e.g., lower signal loss media/medium) between the connectors 202 and the connectors 206. For example, the connection cartridge 600 allows a single component (e.g., the connection cartridge 600 itself) to be installed, removed, replaced, etc., more easily than using separate individual cables. In other embodiments, the connection cartridge allows for more airflow through a network device (e.g., through a chassis of a network device). For example, separate, individual cables may block or obstruct the airflow through the network device. However, the connection cartridge 600 may be parallel, coplanar, inline, etc., with the switch cards which may allow more airflow through the network device. In further embodiments, the connection cartridge 600 allows for size of individual switch cards to be reduced and multiple switch cards to be used because the connection cartridge 600 allows the connectors 202 to be interconnected with the connectors 206, as discussed above. Reducing the size of the switch cards 502 reduces the amount of signal loss of the connections between the connectors 202 and the switch chips 104 of the switch cards 502, as discussed above. In some embodiments, the connection cartridge 600 may be removed without powering down the network device. For example, the connection cartridge 600 may provide a modular configuration for the connection cables which allows for the connection cartridge 600 to be replaced without powering down the network device.

Figure 7:
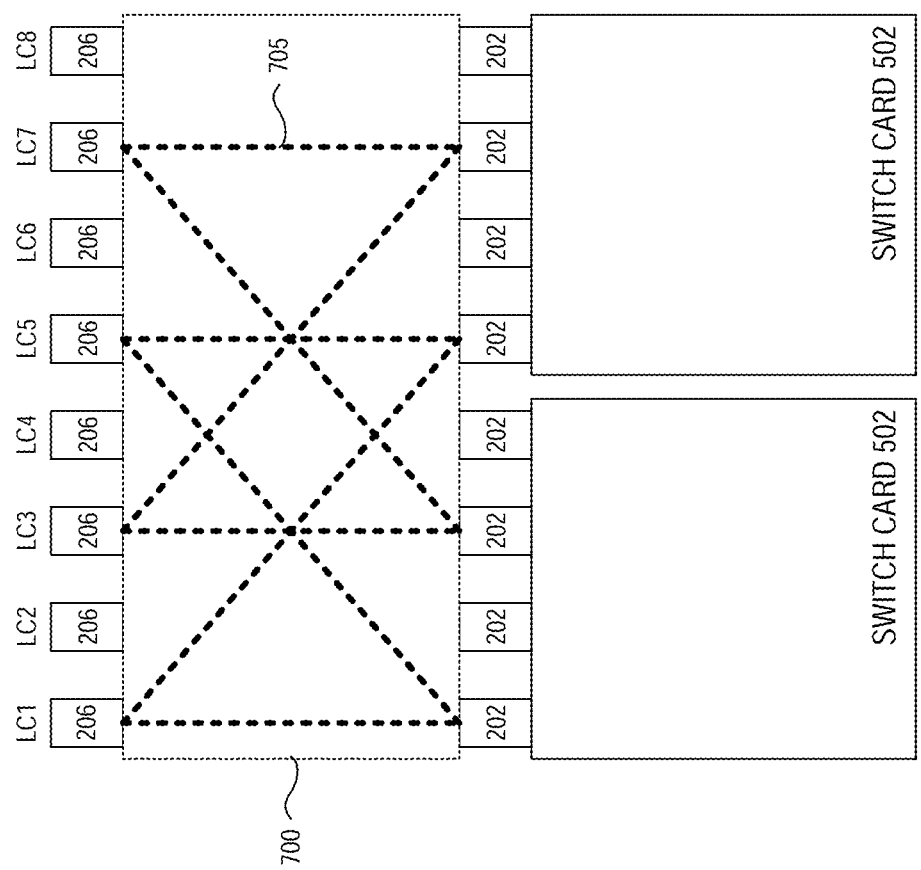
FIG. 7 is a block diagram illustrating an example connection cartridge, in accordance with some embodiments of the present disclosure.

FIG. 7 is a block diagram illustrating an example connection cartridge 700, in accordance with some embodiments of the present disclosure. As discussed above, each switch card includes a switch chip that is mounted on, attached to, installed on, located on, etc., a printed circuit board. Each switch chip is coupled to connectors 202 of the respective switch card. Each connector 202 (of the switch card 502) may be coupled to a respective switch chip via a connection (e.g., one or more wires, pins, traces, etc.). Each connector 202 may be coupled to one or more connectors 206 of the line cards LC1 through LC18. Each of the connectors 202 may be coupled to multiple line cards. Each connector 202 and each connector 206 may have a bandwidth. Each connector 202 may be coupled to connectors 206 of multiple line cards. Connectors 202 may each include multiple sets of connector pins (e.g., multiple sets of one or more wires, traces, etc.). Each set of connector pins may be coupled to a different line card via a connector 206 of the respective line card. In another embodiment, each of the sets of connector pins may use a portion of the bandwidth of a connector 206 (e.g., of a line card connector).

The switch cards 502 may be coupled to the connectors 206 of the line cards LC1 through LC8 via a connection cartridge 700. The connection cartridge 700 includes a plurality of connections or cables, such as twinax cables. The connection cartridge 700 may interconnect the connectors 202 of the switch cards 502 and the connectors 206 of the line cards LC1 through LC8. The cables and/or connections of the connection cartridge 700 may have less signal loss than the connections between the switch chips 104 and the connectors 202.

In some embodiments, connection cartridge 700 may include multiple sets of cables (e.g., twinax cables). FIG. 7 illustrates an example set of cables 705 that may be part of the connection cartridge 700. The set of cables 705 includes eight cables or eight bundles, sets, groups, etc., of individual cables. The set of cables 700 couples the first connector 202 (starting from the left) of the left switch card 502 to line cards LC1 and LC5. The set of cables 705 also couples the third connector 202 (starting from the left) of the left switch card 502 to the line cards LC3 and LC7. The set of cables 700 further couples the first connector (starting from the left) of the right switch card 502 to the line cards LC1 and LC5. The set of cables 705 also couples the third connector (starting from the left) of the right switch card 502 to the line cards LC3 and LC7. The layout or configuration of the set of cables 705 may be duplicated within the connection cartridge 700 and may be used to couple the connectors 202 of the switch cards 502 with the connectors 206 of the line cards LC1 through LC8. Thus, there may be a total of four sets of cables that are used to interconnect the connectors 202 and the connectors 206.

In one embodiment, the bandwidth of the cables (e.g., twinax cables) that form the sets of cables may use a portion of the bandwidth of the connectors 202 and/or 206. In another embodiment, each connector 202 and each connector 206 may include 128 pairs of connections (e.g., 128 pairs of signal wires, 128 differential signal pairs, 128 pairs of pins, traces, etc.). Each of the cables in the connection cartridge 700 may include 64 pairs of wires, pins, traces, etc. Thus, each cable in the connection cartridge 700 may use half of the bandwidth, capacity, throughput, etc., of the connectors 202 and/or 206.

Figure 8:
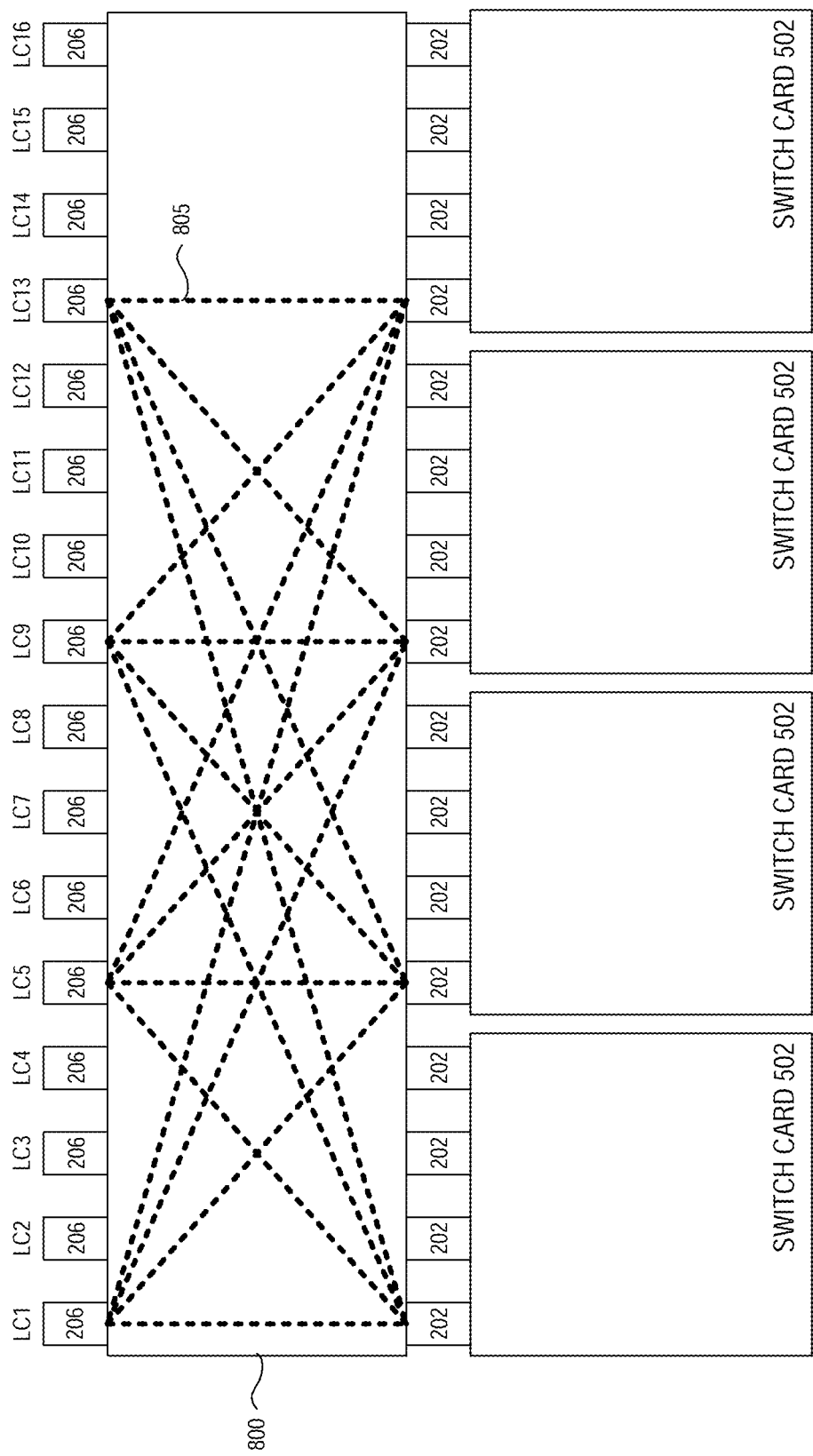
FIG. 8 is a block diagram illustrating an example connection cartridge, in accordance with some embodiments of the present disclosure.

FIG. 8 is a block diagram illustrating an example connection cartridge 800, in accordance with some embodiments of the present disclosure. As discussed above, each switch card 502 includes a switch chip that is mounted on, attached to, installed on, located on, etc., a printed circuit board. Each switch chip is coupled to connectors 202 of the respective switch card. Each connector 202 (of the switch card 502) may be coupled to a respective switch chip via a connection (e.g., one or more wires, pins, traces, etc.). Each connector 202 may be coupled to one or more connectors 206 of the line cards LC1 through LC16. Each of the connectors 202 may be coupled to multiple line cards. Each connector 202 and each connector 206 may have a bandwidth. Each connector 202 may be coupled to connectors 206 of multiple line cards. Connectors 202 may each include multiple sets of connector pins (e.g., multiple sets of one or more wires, traces, etc.). Each set of connector pins may be coupled to a different line card via a connector 206 of the respective line card. In another embodiment, each of the sets of connector pins may use a portion of the bandwidth of a connector 206 (e.g., of a line card connector).

The switch cards 502 may be coupled to the connectors 206 of the line cards LC1 through LC16 via a connection cartridge 800. The connection cartridge 800 includes a plurality of connections or cables, such as twinax cables. The connection cartridge 800 may interconnect the connectors 202 of the switch cards 502 and the connectors 206 of the line cards LC1 through LC16. The cables and/or connections of the connection cartridge 800 may have less signal loss than the connections between the switch chips 104 and the connectors 202.

In some embodiments, connection cartridge 700 may include multiple sets of cables (e.g., twinax cables). FIG. 8 illustrates an example set of cables 805 that may be part of the connection cartridge 800. The set of cables 805 includes sixteen cables or sixteen bundles, groups, sets, etc., of individual cables. The set of cables 805 couples the first connector 202 (starting from the left) of the first switch card 502 (starting from the left) to line cards LC1, LC5, LC9, and LC 13.

The set of cables 805 couples the first connector 202 (starting from the left) of the second switch card 502 (starting from the left) to line cards LC1, LC5, LC9, and LC 13. The set of cables 805 couples the first connector 202 (starting from the left) of the third switch card 502 (starting from the left) to line cards LC1, LC5, LC9, and LC 13. The set of cables 805 couples the first connector 202 (starting from the left) of the fourth switch card 502 (starting from the left) to line cards LC1, LC5, LC9, and LC 13. The layout or configuration of the set of cables 805 may be duplicated within the connection cartridge 805 and may be used to couple the connectors 202 of the switch cards 502 with the connectors 206 of the line cards LC1 through LC16. Thus, there may be a total of four sets of cables that are used to interconnect the connectors 202 and the connectors 206.

In one embodiment, the bandwidth of the cables (e.g., twinax cables) that form the sets of cables may use a portion of the bandwidth of the connectors 202 and/or 206. In another embodiment, each connector 202 and each connector 206 may include 128 pairs of connections (e.g., 128 pairs of signal wires, 128 differential signal pairs, 128 pairs of pins, traces, etc.). Each of the cables in the connection cartridge 800 may include 32 pairs of wires, pins, traces, etc. Thus, each cable in the connection cartridge 700 may use a quarter of the bandwidth, capacity, throughput, etc., of the connectors 202 and/or 206.

Figure 9:
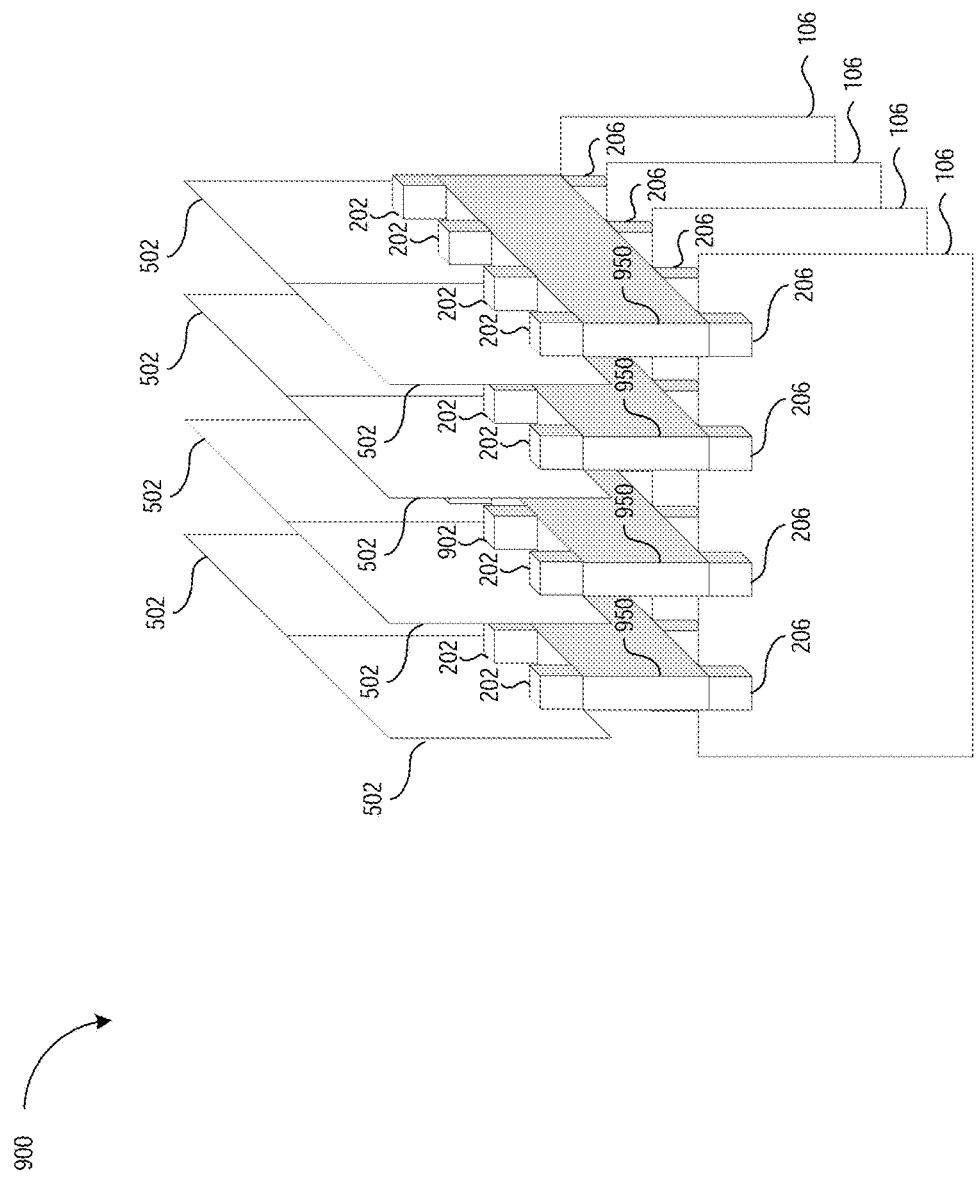
FIG. 9 is a diagram illustrating an example network device, in accordance with some embodiments of the present disclosure.

FIG. 9 is a diagram illustrating an example network device 900, in accordance with some embodiments of the present disclosure. The network device 900 includes multiple line cards 106 coupled through orthogonal connectors 202, 206 (i.e., orthogonal connectors 200) to multiple connection cartridges 950. The connection cartridges 950 may each include multiple sets of cables, as discussed above. The multiple connection cartridges 950 are also coupled to multiple switch cards 502. As illustrated in FIG. 9, each connection cartridge 950 is coplanar (e.g., on the same plane), parallel to, and/or in line with a set of switch cards 502 (e.g., a set of two switch cards 502). Circuits and signals of each line card 106 are coupled to the switch chips of the switch cards 502 through the connectors 202, 206, and the connection cartridges 950 which orient the line cards 106 parallel to each other and orthogonal to the switch cards 502. One edge of each line card 106 meets with (i.e., is adjacent to), and is perpendicular to, one edge of the switch cards 502. The line cards 106 may include contain hardware, software, firmware, or a combination thereof to connect to external user equipment. The switch cards 502 may provide connections between the line cards 106 (e.g., may interconnect the line cards 106).

Figure 10:
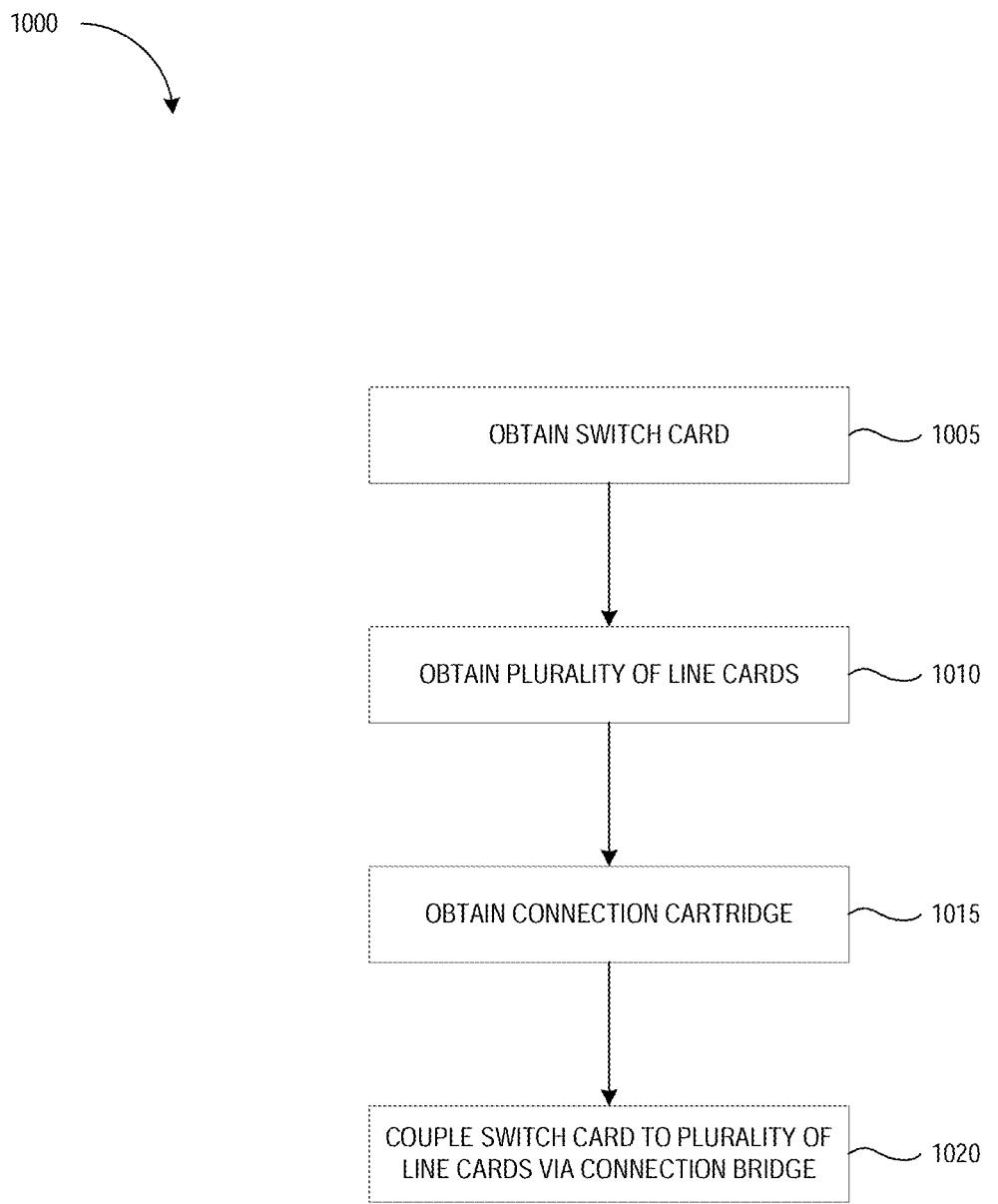
FIG. 10 is a flow diagram of a method of assembling a network device, in accordance with some embodiments of the present disclosure.

FIG. 10 is a flow diagram of a method 1000 of assembling or servicing a network switch device, which can be practiced with embodiments described herein. It should be appreciated that the actions of the method 1000 in FIG. 10 can be performed in differing orders, groupings, or subsets than shown in FIG. 10, for various purposes or user preferences.

The method 1000 begins at block 1005 where one or more switch cards are obtained. For example, line cards 502 illustrated in FIGS. 5A through 8 may be obtained. At block 1010, a plurality of line cards are obtained. For example, line cards 106 illustrated in FIGS. 5A through 8 may be obtained. At block 1015, a connection cartridge may be obtained. For example, the one or more of the connection cartridges illustrated in FIGS. 6 through 8 may be obtained. At block 1020, the switch card (or multiple switch cards) may be coupled to the plurality of line cards via the connection cartridge, as discussed above. For example, the switch card (or multiple switch cards) may be coupled to the plurality of line cards via the connection cartridge as illustrated in FIGS. 6 through 9.

Figure 11:
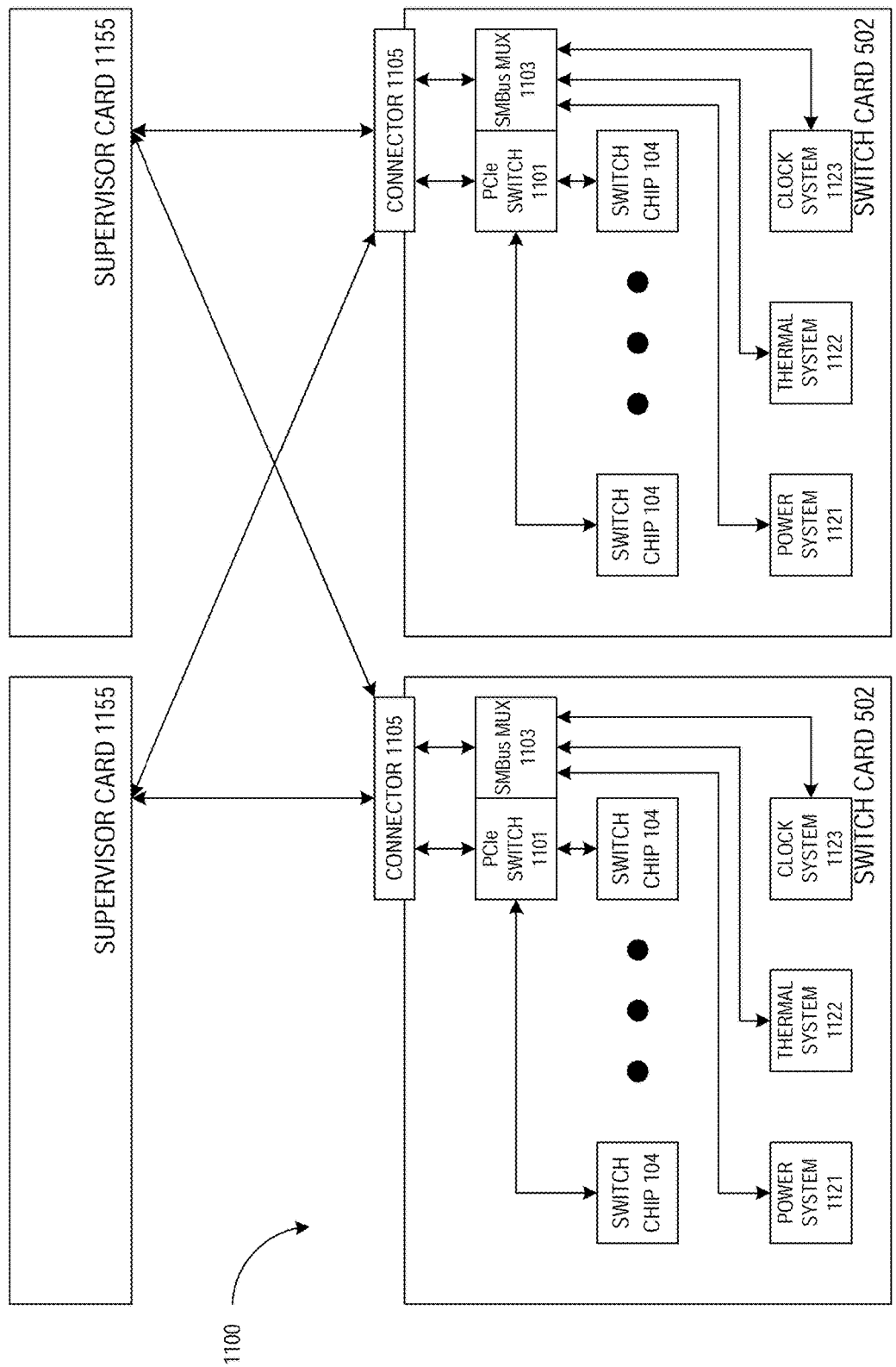
FIG. 11 is a block diagram illustrating an example network device, in accordance with some embodiments of the present disclosure.

FIG. 11 is a block diagram illustrating an example network device 1100, in accordance with some embodiments of the present disclosure. The network device 1100 may include a control plane and a data plane. In one embodiment, the data plane receives, processes, and forwards network data using various control plane data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination, and forwards the packet out the proper outgoing interface. In other embodiments, the control plane may perform functions related to quality of service, access control lists management (or other types of security), policy service, fan agent, light emitting diode agent, temperature sensor agent, database service, management service(s), processes to support networking protocols (e.g. spanning tree protocol (STP), routing protocols (e.g. such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol), Multiprotocol Label Switching (MPLS), and/or other types of networking protocols), network flow management applications (e.g., openflow, directflow), process manager, etc.

In one embodiment, the control plane gathers the control plane data from different sources (e.g., locally stored configuration data, via a command line interface, or other management channel such as Simple Network Management Protocol (SNMP)) and configures the data plane using the control plane data. The control plane data may include information corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages for packets marked as being of interest for snooping (e.g., access control list logging and port mirroring messages), messages used to collect traffic diagnostics, address resolution messages (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the supervisor cards 1155 may be part of the control plane. The supervisor cards 1115 may include hardware (e.g., processors, memories, connectors, etc.), software, and/or firmware that allow the supervisor cards 1155 to perform various control plane functions, as discussed above. As illustrated in FIG. 11, the network device 1100 includes two supervisor cards 1155. For example, the network device 1100 may include two supervisor cards 1155 for redundancy in case one of the supervisor cards 1155 fails. Although two supervisor cards 1155 are illustrated, the network device 1100 may include any number of supervisor cards in other embodiments.

In one embodiment, the switch cards 502 may also be part of the control plane. For example, the switch chips 104 may be configured by the control plane to route network data (e.g., packets, frames, etc.) to different line cards which may be coupled to the switch cards 502 (as discussed above). In another example, the switch cards 502 may be used to communicate control plane data to other switch cards and/or other network devices.

The network device 1100 includes supervisor cards 1155 and switch cards 502. Each switch card includes a connector 1105, one or more switch chips 104, a peripheral component interconnect express (PCIe) switch 1101, a system management bus (SMBus) multiplexer (MUX) 1103, a power system 1121, a thermal system 1122, and a clock system 1123. The PCIe switch 1101 may be used to communicate control plane data with the one or more switch chips 104. The SMBus MUX may be used to communicate configuration data with the power system 1121, the thermal system 1122, and/or the clock system 1123. The configuration data may be data that is used to control and/or configure the power system 1121, the thermal system 1122, and/or the clock system 1123. For example, the configuration data may be a message, packet, and/or other data that may instruct the power system 1121, the thermal system 1122, and/or the clock system 1123 to perform an operation. The configuration data may also be data that may provide information about the status and/or configuration of the power system 1121, the thermal system 1122, and/or the clock system 1123. For example, the configuration data may be a message generated by the power system 1121 that indicates the current amount of power used by a switch card 502.

In one embodiment, the power system 1121 may be used to control power supplied to and/or used by a switch card 502. The power system 1121 may also provide information about the power used by the switch card 502 (e.g., whether the switch card 502 is receiving enough power). In another embodiment, the thermal system 1122 may be used to detect and control the temperature of the switch card 502 and/or components of the switch card 502. For example, the thermal system 1122 may receive a request for the temperature of a switch chip 104 and may provide the temperature of the switch chip 104 to a supervisor card 1155. The thermal system 1122 may also be used to control fans that may be coupled to the switch card 502. In a further embodiment, the clock system 1123 may be used to set the time and/or date for the switch card 502. The time and/or date may be used to timestamp and/or logging purposes. In other embodiments, the switch cards 502 may include various other systems that may perform various other functions.

As discussed above, rather than using one larger switch card, two (or more) smaller switch cards may be used. For example, two switch cards 502 may be used. However, when multiple switch cards are used, this increase the number of connections and/or channels between the supervisor cards 1155 and the switch cards 502. For example, because there are two switch cards 502, there are four connections between the supervisor cards 1155 and the connectors 1105 of the switch cards 502 to allow the supervisor cards 1155 to communicate the control plane data with both the switch cards 502.

Increasing the number of connections between the supervisor cards 1155 and the switch cards 502 also increases the complexity of other hardware and/or software that may be used by the supervisor cards 1155 to support the additional connections. For example, the switch cards 502 may use a peripheral component interconnect express (PCIe) bus to connect the supervisor cards 1155 to the switch chips 104. If the number of connections between the supervisor cards 1155 and the switch cards 502, additional PCIe buses may be added to the network device 1100. In addition, the software and/or firmware (e.g., drivers) may be updated in order to support the additional PCIe buses and/or PCIe endpoints (e.g., endpoints that couple the switch chips 104 to the PCIe switch 1101). These factors may increase the complexity and/or costs of manufacturing the switch cards 502. Thus, it may be useful to use multiple switch cards without increasing the number of connections, the complexity, and/or the manufacturing costs of the switch cards 502.

Figure 12:
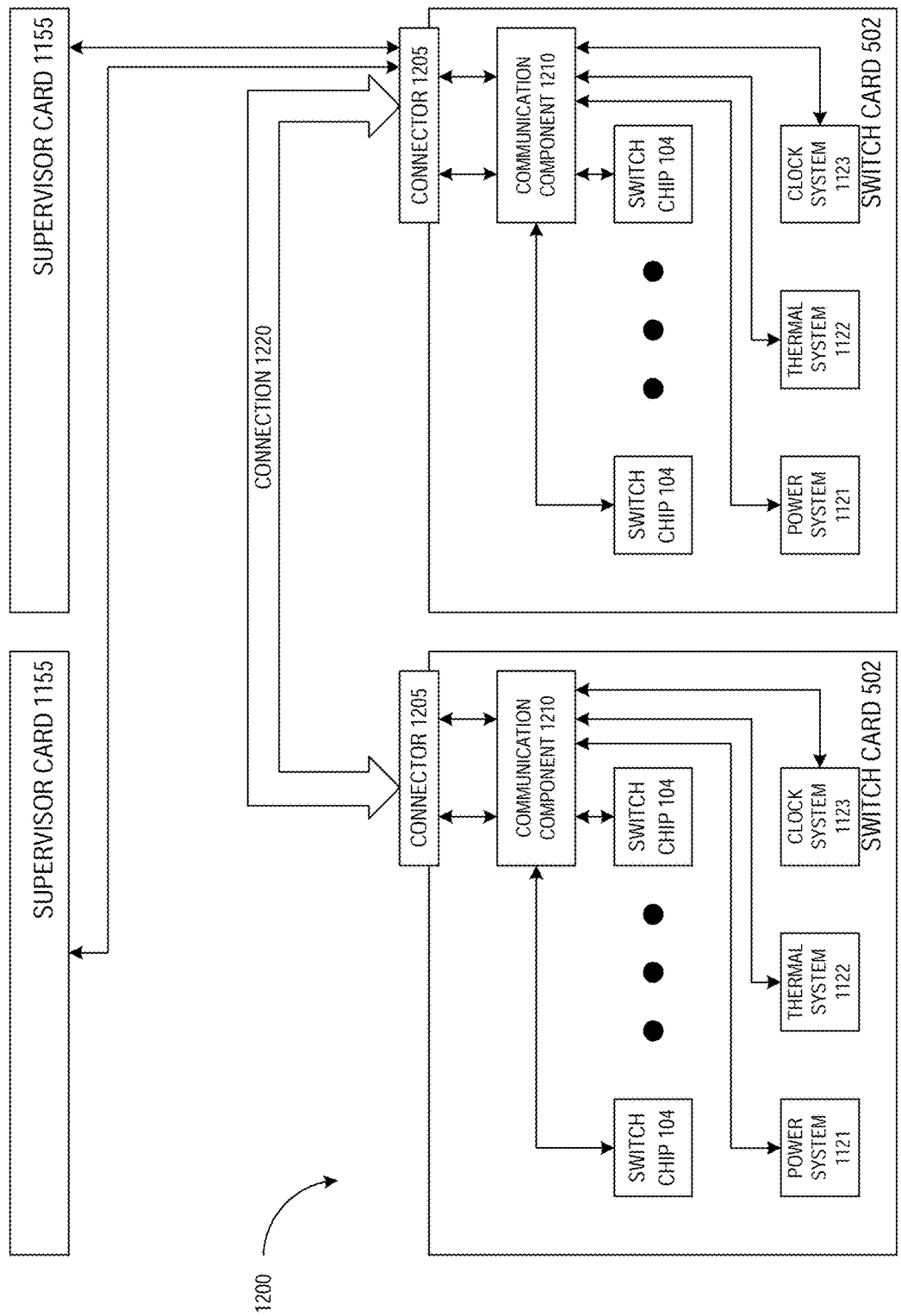
FIG. 12 is a block diagram illustrating an example network device, in accordance with some embodiments of the present disclosure.

FIG. 12 is a block diagram illustrating an example network device 1200, in accordance with some embodiments of the present disclosure. The network device 1200 may include a control plane and a data plane. In one embodiment, the data plane receives, processes, and forwards network data using various control plane data, as discussed above. In one embodiment, the control plane gathers the control plane data from different sources and configures the data plane using the control plane data, as discussed above. The supervisor cards 1155 may be part of the control plane. The supervisor cards 1115 may include hardware, software, and/or firmware that allow the supervisor cards 1155 to perform various control plane functions, as discussed above. Although two supervisor cards 1155 are illustrated, the network device 1200 may include any number of supervisor cards in other embodiments. In one embodiment, the switch cards 502 may also be part of the control plane, as discussed above.

The network device 1200 includes supervisor cards 1155 and switch cards 502. Each switch card includes a connector 1105, one or more switch chips 104, a communication component 1210, a power system 1121, a thermal system 1122, and a clock system 1123. The communication component 1210 may be used to communicate control plane data with the one or more switch chips 104. The communication component 1210 may also be used to communicate configuration data with the power system 1121, thermal system 1122, and/or clock system 1123. The power system 1121 may be used to provide information about and/or control power supplied to and/or used by a switch card 502. The thermal system 1122 may be used to detect and control the temperature of the switch card 502 and/or components of the switch card 502. The clock system 1123 may be used to set the time and/or date for the switch card 502.

As illustrated in FIG. 12, the connector 1205 may couple a switch card 502 to the supervisor cards 1155. For example, the connector 1205 may be coupled to the supervisor cards 1155 via pins, wires, traces, connections, cables, etc. The connectors 1205 may also couple the left switch card 502 to the right switch card 502. This may allow the two switch cards 502 to communicate control plane data and/or configuration data with each other. The connectors 1205 may be coupled to each other via a connection 1220. The connection 1220 may include one or more pins, traces, wires, etc. For example, the connection 1220 may be a cable that is plugged into, inserted into, and/or connector to the connectors 1205. The connection 1220 and/or the connectors 1205 may include different sets of pins, traces, wires, etc., and the different sets of pins, races, wires, etc., may be coupled to different portions of the communication component 1210, as discussed in more detail below.

In one embodiment the communication component 1210 may be determine whether a switch card 502 should operate in a master mode or a slave mode. For example, the communication component 1210 of the right switch card 502 may determine whether one or more pins of the connector 1205 have been shorted to ground. If the one or more pins have been shorted to ground or power, the communication component 1210 may determine that the switch card 502 should operate in the master mode. If the one or more pins have not been shorted to ground or power, the switch card 502 may operate in the slave mode. In another example, the communication component 1210 may determine whether a message, packet, frame, and/or other data has been received, indicating that the switch card 502 should operate in the master mode. When operating in the master mode, a switch card 502 may be coupled to the supervisor cards 1155 (e.g., may be directly coupled via a connector and/or cable). The switch card 502 may communicate (e.g., transmit and/or receive) control plane data and/or configuration data with the supervisor cards 1155 in the master mode. With reference to FIG. 12, the left switch card 502 may operate in the slave mode and the right switch card 502 may operate in the master mode.

In one embodiment, the communication component 1210 of the right switch card 502 may determine where the different switch chips 104 are located and/or where the different systems (e.g., the power systems 1121, the thermal systems 1122, and the clock systems 1123) are located. For example, the communication component 1210 of the right switch card 502 may detect the switch chips 104 and/or systems that are located on the right switch card 502. The communication component 1210 of the right switch card 502 may also communicate with the communication component 1210 of the left switch card 502 to determine which switch chips 104 and/or systems are located on the left switch card 502.

In one embodiment, the communication component 1210 of the right switch card 502 may communicate the control plane data and/or the configuration data with the left switch card 502. For example, the communication component 1210 may determine whether the control plane data and/or configuration data is for one or more switch chips 104 and/or one or more systems of the left switch card 502 and/or the right switch card 502. If the control plane data and/or configuration data is for one or more switch chips 104 and/or systems on the left switch card 502, the communication component 1210 may forward the control plane data and/or configuration data to the left switch card 502 via the connection 1220. If the control plane data and/or configuration data is for one or more switch chips 104 and/or systems on the right switch card 502, the communication component 1210 may forward the control plane data and/or configuration data directly to the one or more switch chips 104 and/or systems.

The communication component 1210 may determine whether the control plane data and/or configuration data is for one or more switch chips 104 and/or one or more systems of the left switch card 502 and/or the right switch card 502 by analyzing the control plane data and/or configuration data. For example, the communication component 1210 may analyze the control plane data to determine whether the control plane data includes one or more identifiers for one or more switch chips 104. The communication component 1210 may determine where the switch chips 104 (which are identified by the identifiers) are located. In another example, the configuration data may include an address for a system. The communication component 1210 may determine where the system is located based on the address.

In one embodiment, the communication component 1210 of the left switch card 502 may communicate control plane data and/or configuration data via the right switch card 502 when the left switch card 502 operates in the slave mode. For example, the communication component 1210 of the left switch card 502 may transmit and/or receive control plane data and/or configuration data from the supervisor cards 1155 via the right switch card 502 and the connection 1220. Thus, the left switch card 502 may not communicate control plane data and/or configuration data with the supervisor cards 1155 directly when operating in the slave mode. The left switch card 502 may communicate control plane data and/or configuration data with the supervisor cards 1155 indirectly via the right switch card 502, when operating in the slave mode.

In one embodiment, one or more of the switch chips 104 may be configured based on the control plane data. For example, the communication component 1210 may receive control plane data that indicate different qualities of service for different types of network data (e.g., different types of packets). The switch chips 104 may forward network data (e.g., packets) in the data plane (e.g., to the different line cards) based on the different qualities of service. In another example, the communication component 1210 may receive control plane data that indicates routing tables and/or update to routing tables. The switch chips 104 may forward network data based on the routing tables.

Although two switch cards are illustrated in FIG. 12, more than two switch cards 502 may be used in other embodiments. In one embodiment, if more than two switch cards 502 are used, the switch cards 502 may be daisy changed to each other via multiple connections 1220. In another embodiment, if more than two switch cards 502 are used, each of the switch cards 502 that operate in the slave mode may be directly coupled to the switch card 502 that operates in the master mode via a connection 1220.

Figure 13:
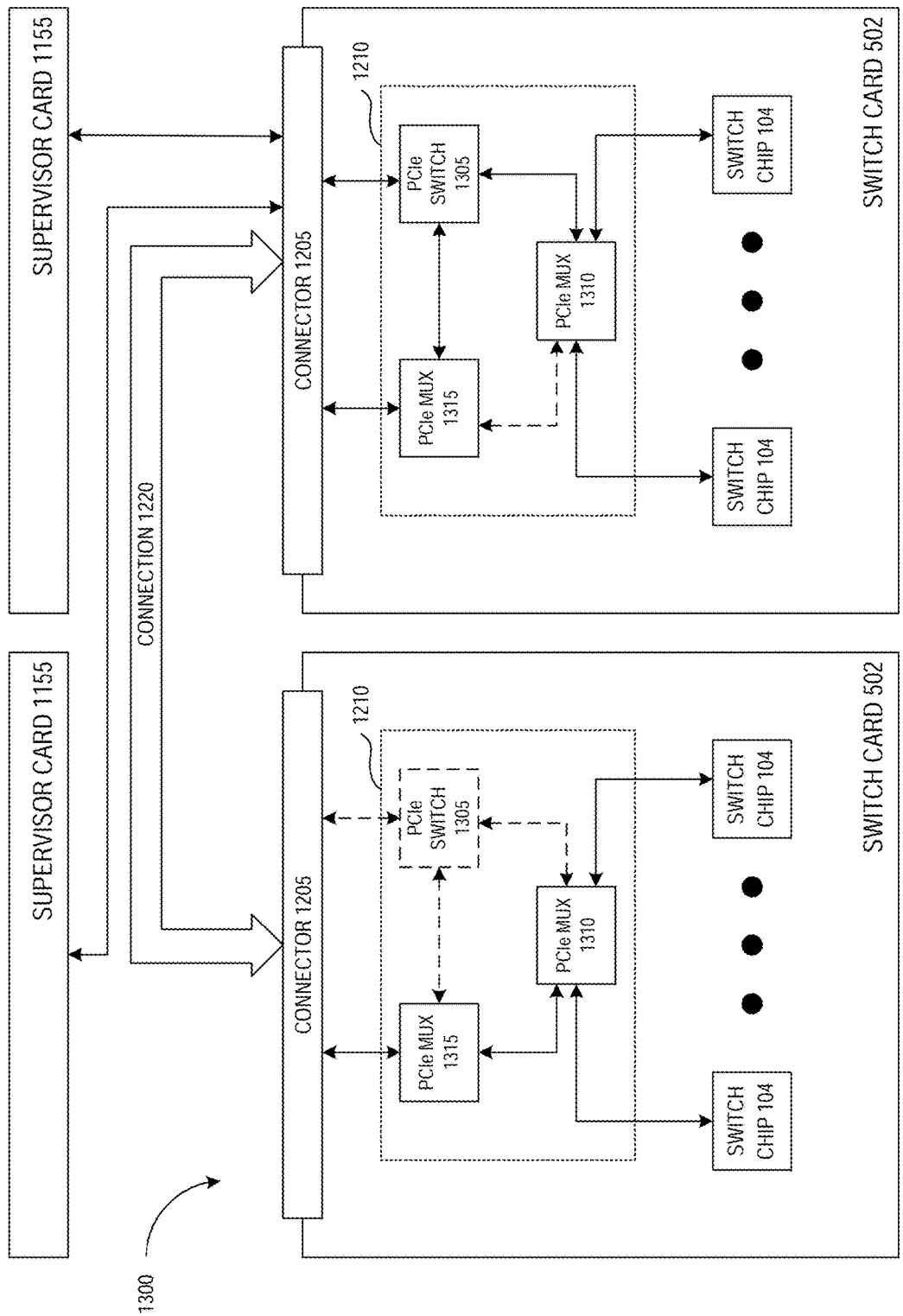
FIG. 13 is a block diagram illustrating an example network device, in accordance with some embodiments of the present disclosure.

FIG. 13 is a block diagram illustrating an example network device 1300, in accordance with some embodiments of the present disclosure. The network device 1300 may include a control plane and a data plane. In one embodiment, the data plane receives, processes, and forwards network data using various control plane data, as discussed above. In one embodiment, the control plane gathers the control plane data from different sources and configures the data plane using the control plane data, as discussed above. The supervisor cards 1155 may be part of the control plane. The supervisor cards 1115 may include hardware, software, and/or firmware that allow the supervisor cards 1155 to perform various control plane functions, as discussed above. Although two supervisor cards 1155 are illustrated, the network device 1300 may include any number of supervisor cards in other embodiments. In one embodiment, the switch cards 502 may also be part of the control plane, as discussed above.

The network device 1300 includes supervisor cards 1155 and switch cards 502. Each switch card includes a connector 1205, one or more switch chips 104, a communication component 1210, a power system 1121, a thermal system 1122, and a clock system 1123. The communication component 1210 may be used to communicate control plane data with the one or more switch chips 104. The communication component 1210 may also be used to communicate configuration data with the power system 1121, thermal system 1122, and/or clock system 1123. The power system 1121 may be used to provide information about and/or control power supplied to and/or used by a switch card 502. The thermal system 1122 may be used to detect and control the temperature of the switch card 502 and/or components of the switch card 502. The clock system 1123 may be used to set the time and/or date for the switch card 502.

As illustrated in FIG. 13, the connector 1205 may couple a switch card 502 to the supervisor cards 1155. The connectors 1205 may also couple the left switch card 502 to the right switch card 502. This may allow the two switch cards 502 to communicate control plane data and/or configuration data with each other. The connectors 1205 may be coupled to each other via a connection 1220 (e.g., pins, wires, traces, a cable, etc.). The connection 1220 and/or the connectors 1205 may include different sets of pins, traces, wires, etc., and the different sets of pins, traces, wires, etc., may be coupled to different portions of the communication component 1210. One or more sets of pins, wires, traces, etc., may be coupled to the supervisor cards 1155. One or more other sets of pins, wires, traces, etc., may be coupled to the connection 1220.

In one embodiment the communication component 1210 may be determine whether a switch card 502 should operate in a master mode or a slave mode. The communication component 1210 may receive control plane data and/or configuration data with the supervisor cards 1155 in the master mode and/or may communicate (e.g., transmit and/or receive) the control plane data and/or configuration data with other switch cards that are operating in the slave mode, as discussed above. The communication component 1210 may communicate control plane data and/or configuration data with another switch card 502 when the switch card is operating in the slave mode. With reference to FIG. 13, the left switch card 502 may operate in the slave mode and the right switch card 502 may operate in the master mode.

As illustrated in FIG. 13, the communication component 1210 includes a PCIe switch 1305, a PCIe MUX 1310, and a PCIe MUX 1315. The PCIe switch 1310 may be coupled to the connector 1205 via a first set of pins, wires, traces, etc., of the connector 1205. The PCIe switch is also coupled to the PCIe MUX 1310 and the PCIe MUX 1315. The PCIe MUX 1310 is coupled to the switch chips 104. The PCIe MUX 1310 is coupled to the PCIe MUX 1315. The PCIe MUX 1315 is coupled to the connector 1205 via a second set of pins, wires, traces, etc., of the connector 1205.

In one embodiment, the PCIe switch 1305 may be used by the switch card 502 when the switch card 502 is operating in the master mode. The PCIe switch 1305 may allow the communication component 1210 to communicate control plane data to a switch card 502 operating in the slave mode (e.g., a slave switch card) via the PCIe MUX 1315. The PCIe MUX 1310 allows a switch card 502 to communicate control plane data to the switch chips 104 of the switch card 502. The PCIe MUX 1315 allows the switch card 502 to communicate control plane data with other switch cards 502 that are operating in the slave mode (e.g., with the left switch card 502). For example, the PCIe MUX 1315 may receive control plane data from a switch card operating in the master mode (e.g., a master switch card, the right switch card 502) via the connector 1205. The PCIe MUX 1315 may provide the control plane data to the PCIe MUX 1310 which may provide the control plane data to one or more switch chips 104.

In the right switch card 502, the connection between the PCIe MUX 1310 and the PCIe MUX 1315 is not used because the right switch card 502 is operating in the master mode. In the left switch card 502, the PCIe switch 1305, and the connection between the PCIe switch 1305 and the connector 1205 are not used because the left switch card 502 is operating in the slave mode. Thus, the left switch card 502 is not receiving control plane data from the supervisor cards 1155. In addition, the connections between the PCIe switch 1305, and the PCIe mux 1310 and PCIe mux 1315 are not used because the left switch card 502 is operating in the slave mode.

Figure 14:
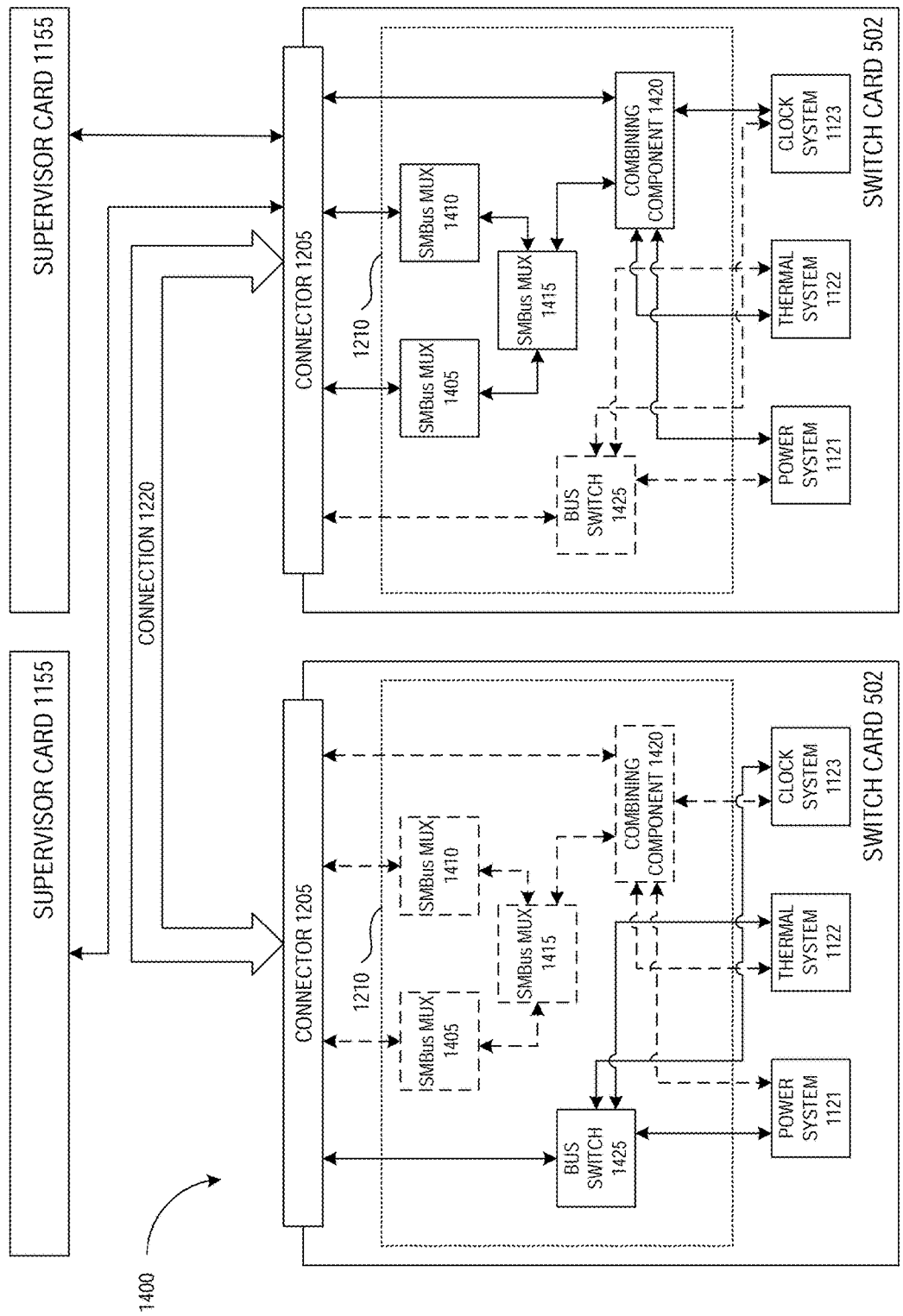
FIG. 14 is a block diagram illustrating an example network device, in accordance with some embodiments of the present disclosure.

FIG. 14 is a block diagram illustrating an example network device 1400, in accordance with some embodiments of the present disclosure. The network device 1400 may include a control plane and a data plane. In one embodiment, the data plane receives, processes, and forwards network data using various control plane data, as discussed above. In one embodiment, the control plane gathers the control plane data from different sources and configures the data plane using the control plane data, as discussed above. The supervisor cards 1155 may be part of the control plane. The supervisor cards 1115 may include hardware, software, and/or firmware that allow the supervisor cards 1155 to perform various control plane functions, as discussed above. Although two supervisor cards 1155 are illustrated, the network device 1400 may include any number of supervisor cards in other embodiments. In one embodiment, the switch cards 502 may also be part of the control plane, as discussed above.

The network device 1400 includes supervisor cards 1155 and switch cards 502. Each switch card includes a connector 1105, one or more switch chips 104, a communication component 1210, a power system 1121, a thermal system 1122, and a clock system 1123. The communication component 1210 may be used to communicate control plane data with the one or more switch chips 104. The communication component 1210 may also be used to communicate configuration data with the power system 1121, thermal system 1122, and/or clock system 1123. The power system 1121 may be used to provide information about and/or control power supplied to and/or used by a switch card 502. The thermal system 1122 may be used to detect and control the temperature of the switch card 502 and/or components of the switch card 502. The clock system 1123 may be used to set the time and/or date for the switch card 502.

As illustrated in FIG. 14, the connector 1205 may couple a switch card 502 to the supervisor cards 1155. The connectors 1205 may also couple the left switch card 502 to the right switch card 502. This may allow the two switch cards 502 to communicate control plane data and/or configuration data with each other. The connectors 1205 may be coupled to each other via a connection 1220 (e.g., pins, wires, traces, a cable, etc.). The connection 1220 and/or the connectors 1205 may include different sets of pins, traces, wires, etc., and the different sets of pins, traces, wires, etc., may be coupled to different portions of the communication component 1210. One or more sets of pins, wires, traces, etc., may be coupled to the supervisor cards 1155. One or more other sets of pins, wires, traces, etc., may be coupled to the connection 1220.

In one embodiment the communication component 1210 may be determine whether a switch card 502 should operate in a master mode or a slave mode. The communication component 1210 may receive control plane data and/or configuration data with the supervisor cards 1155 in the master mode and/or may communicate (e.g., transmit and/or receive) the control plane data and/or configuration data with other switch cards that are operating in the slave mode, as discussed above. The communication component 1210 may communicate control plane data and/or configuration data with another switch card 502 when the switch card is operating in the slave mode. With reference to FIG. 14, the left switch card 502 may operate in the slave mode and the right switch card 502 may operate in the master mode.

As illustrated in FIG. 14, the communication component 1210 includes a SMBus MUX 1405, a SMBus MUX 1410, and a SMBus MUX 1415. The SMBus MUX 1405 and the SMBux MUX 1410 may each be coupled to the connector 1205 via a set of pins, wires, traces, etc., of the connector 1205. SMBux MUX 1405 may receive configuration data from the left supervisor card 1115 and the SMBux MUX 1410 may receive configuration data from the right supervisor card 1115. The SMBux MUX 1405 and SMBux MUX 1410 are coupled to the SMBux MUX 1415. SMBux MUX 1415 is coupled to a combining component 1420. The combining component 1420 may provide the configuration data to the different systems of the switch card 502 and may also provide the configuration data to the systems of the switch cards 502 that are operating in a slave mode (e.g., to slave switch cards). The communication component 1210 also includes a bus switch 1425. The bus switch 1425 may be used to communicate configuration data with a master switch card (via the connection 1220) when the switch card 502 is operating in the slave mode.

In the right switch card 502, the bus switch 1425 and the connections between the bus switch 1425, and the connector 1205, the power system 1121, the thermal system 1122, and the clock system 1123, are not used because the right switch card is operating in a master mode (e.g., is a master switch card). The right SMBus MUXes 1405, 1410, and 1415 are used to communicate configuration data with the power system 1121, the thermal system 1122, and the clock system 1123 of the right switch card 502. The right combining component 1420 is used to communicate configuration data with the left switch card 502 via the connection 1220.

In the left switch card 502, the SMBus MUXes 1405, 1410, 1415, the combining component 1420, and their connections to other components of the left communication component 1210 are not used because the left switch card 502 is operating in the slave mode. Thus, the left switch card 502 may not receive configuration data from the supervisor cards 1155 directly, but may receive the configuration data from the supervisor cards 1155 indirectly via the connection 1220 and the right switch card 502 (e.g., via the communication component 1210 of the right switch card 502). The bus switch 1425 is used when the left switch card 502 is in the slave mode. When the left switch card 502 is in the slave mode, the bus switch 1425 is used to communicated (e.g., transmit and/or receive) configuration data with the communication component 1210 of the right switch card 502.

Figure 15:
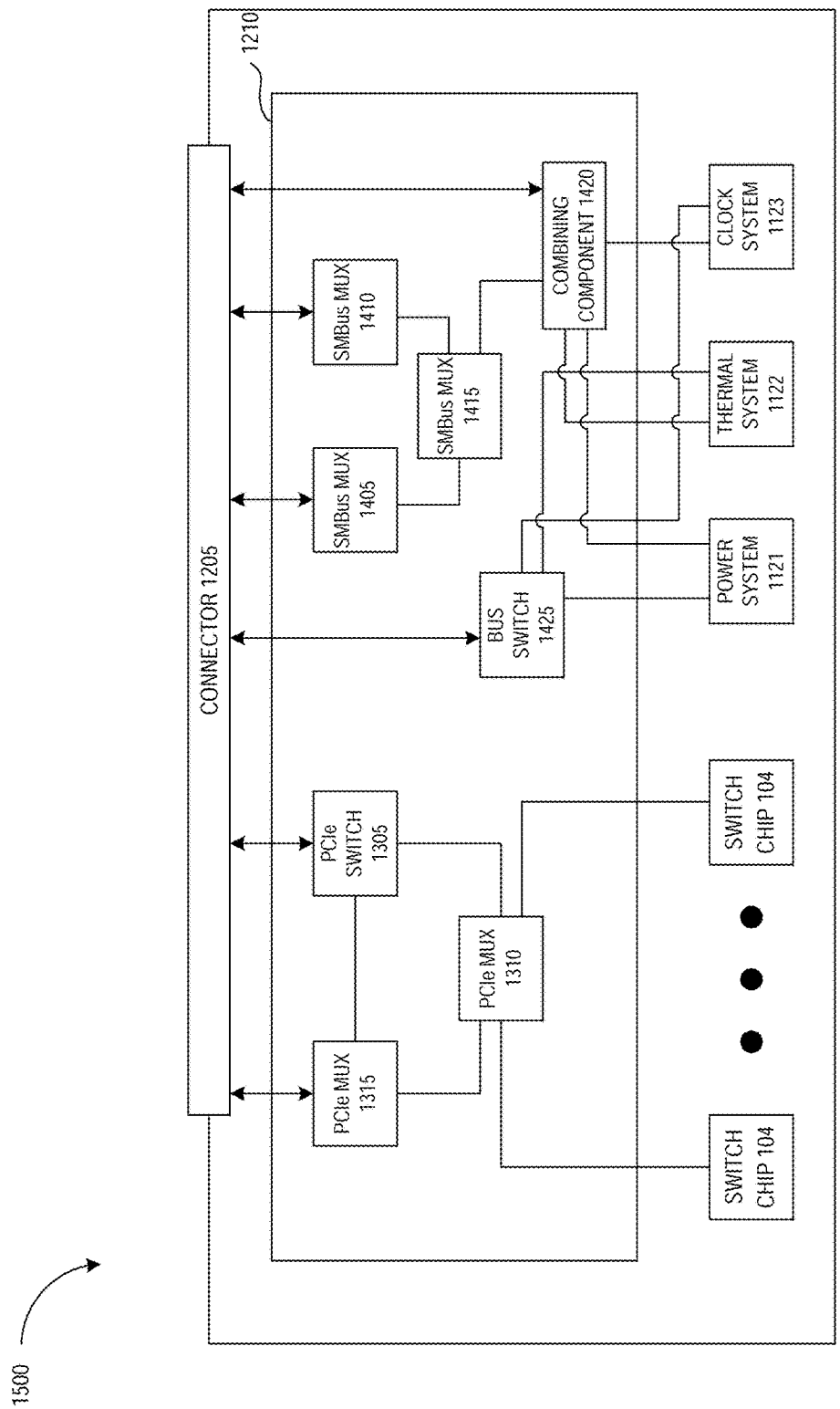
FIG. 15 is a block diagram illustrating an example communication component, in accordance with some embodiments of the present disclosure.

FIG. 15 is a block diagram illustrating an example switch card 1500, in accordance with some embodiments of the present disclosure. The switch card 1500 includes one or more switch chips 104, a power system 1121, a power system 1122, and a clock system 1123. The switch card 1500 also includes a connector 1205 and a communication component 1210.

As illustrated in FIG. 15, the communication component 1210 includes a PCIe switch 1305, a PCIe MUX 1310, and a PCIe MUX 1315. The PCIe switch 1310 may be coupled to the connector 1205 via a first set of pins, wires, traces, etc., of the connector 1205. The PCIe switch is also coupled to the PCIe MUX 1310 and the PCIe MUX 1315. The PCIe MUX 1310 is coupled to the switch chips 104. The PCIe MUX 1310 is coupled to the PCIe MUX 1315. The PCIe MUX 1315 is coupled to the connector 1205 via a second set of pins, wires, traces, etc., of the connector 1205.

The communication component 1210 also includes a SMBus MUX 1405, a SMBus MUX 1410, and a SMBus MUX 1415. The SMBus MUX 1405 and the SMBux MUX 1410 may each be coupled to the connector 1205 via a set of pins, wires, traces, etc., of the connector 1205. SMBux MUX 1405 may receive configuration data from the left supervisor card 1115 and the SMBux MUX 1410 may receive configuration data from the right supervisor card 1115. The SMBux MUX 1405 and SMBux MUX 1410 are coupled to the SMBux MUX 1415. SMBux MUX 1415 is coupled to a combining component 1420. The combining component 1420 may provide the configuration data to the different systems of the switch card 502 and may also provide the configuration data to the systems of the switch cards 502 that are operating in a slave mode (e.g., to slave switch cards). The communication component 1210 also includes a bus switch 1425. The MUXes, switches, components, etc., of the communication component 1210 may perform functions as described above in conjunction with FIGS. 13 and 14.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A switch card, comprising:
  a set of switch chips configured to communicate data with a plurality of line cards, wherein:
    the plurality of line cards is coupled to a second switch card; and
    the second switch card comprises a second set of switch chips; and
  a communication component coupled to the set of switch chips, the communication component configured to:
    determine whether the switch card should operate in a master mode or a slave mode;
    in response to determining that the switch card should operate in the master mode, receive control plane data from a supervisor card; and communicate the control plane data to one or more switch chips of the set of switch chips and the second set of switch chips.

2. The switch card of claim 1, wherein the communication component is further configured to:
determine whether the control plane data is for a first switch chip of the set of switch chips or a second switch chip of the second set of switch chips.

3. The switch card of claim 2, wherein to communicate the control plane data the communication component is further configured to:
forward the control plane data to the first switch chip in response to determining that the control plane data is for the first switch chip; and
forward the control plane data to the second switch chip in response to determining that the control plane data is for the second switch chip.

4. The switch card of claim 1, wherein the communication component is further configured to:
receive the control plane data from the second switch card in response to determining that the switch card should operate in the slave mode.

5. The switch card of claim 1, wherein the switch card is coupled to the second switch card via a connection.

6. The switch card of claim 1, wherein the second switch card communicates the control plane data with the supervisor card via the switch card.

7. The switch card of claim 1, wherein the communication component comprises a peripheral component interconnect express (PCIe) switch.

8. The switch card of claim 7, wherein the communication component further comprises a first PCIe multiplexer and a second PCIe multiplexer.

9. The switch card of claim 1, wherein the one or more switch chips are configured based on the control plane data.

10. The switch card of claim 1, wherein:
the switch card is coupled to the plurality of line cards via a set of connectors; and
the second switch card is coupled to the plurality of line cards via the set of connectors.

11. A switch card, comprising:
a set of switch chips configured to communicate data with a plurality of line cards, wherein the plurality of line cards is coupled to a second switch card; and
a communication component coupled to the set of switch chips, the communication component configured to:
determine whether the switch card should operate in a master mode or a slave mode;
in response to determining that the switch card should operate in the master mode, receive configuration data from a supervisor card; and
communicate the configuration data to one or more systems of the switch card and the second switch card.

12. The switch card of claim 11, wherein the communication component is further configured to:
determine whether the configuration data is for a first system of the switch card or a second system of the second switch card.

13. The switch card of claim 12, wherein to communicate the configuration data the communication component is further configured to:
forward the configuration data to the first system in response to determining that the configuration data is for the first system; and
forward the configuration data to the second system in response to determining that the configuration data is for the second system.

14. The switch card of claim 11, wherein the communication component is further configured to:
receive the configuration data from the second switch card in response to determining that the switch card should operate in the slave mode.

15. The switch card of claim 11, wherein the switch card is coupled to the second switch card via a connection.

16. The switch card of claim 11, wherein the second switch card communicates control plane data with the supervisor card via the switch card.

17. The switch card of claim 11, wherein the communication component comprises a system management bus (SMBus) switch.

18. The switch card of claim 17, wherein the communication component further comprises a first (SMBus) multiplexer and a second (SMBus) multiplexer.

19. The switch card of claim 11, wherein:
the switch card is coupled to the plurality of line cards via a set of connectors; and
the second switch card is coupled to the plurality of line cards via the set of connectors.

20. A network device, comprising:
a first switch card comprising a first set of switch chips; and
a second switch card, comprising:
a second set of switch chips configured to communicate data with a plurality of line cards; and
a communication component coupled to the second set of switch chips, the communication component configured to:
determine whether the second switch card should operate in a master mode or a slave mode;
in response to determining that the second switch card should operate in the master mode, receive control plane data from a supervisor card; and
communicate the control plane data to one or more switch chips of the first set of switch chips and the second set of switch chips.

* * * * *